United States Patent
Endo et al.

(10) Patent No.: US 6,615,303 B1
(45) Date of Patent: Sep. 2, 2003

(54) COMPUTER SYSTEM WITH MULTIPLE OPERATING SYSTEM OPERATION

(75) Inventors: Yoshinori Endo, Mito (JP); Kozo Nakamura, Hitachiota (JP); Tadashi Kamiwaki, Tokai-mura (JP); Masahiko Saito, Hitachi (JP); Hiroshi Ohno, Hitachi (JP); Tomoaki Nakamura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/574,839

(22) Filed: May 19, 2000

(30) Foreign Application Priority Data

May 21, 1999 (JP) .......................................... 11-140914

(51) Int. Cl.[7] .......................... G06F 13/24; H04B 7/185
(52) U.S. Cl. .................. 710/260; 710/261; 342/357.01; 342/357.02
(58) Field of Search ................................ 710/260–264; 342/357.01–357.18; 701/33, 31, 39

(56) References Cited

U.S. PATENT DOCUMENTS

| | | | | |
|---|---|---|---|---|
| 5,596,500 A | * | 1/1997 | Sprague et al. ............. 701/213 |
| 5,901,319 A | * | 5/1999 | Hirst ........................... 717/164 |
| 6,047,280 A | * | 4/2000 | Ashby et al. ................... 707/2 |
| 6,121,924 A | * | 9/2000 | Meek et al. ........... 342/357.13 |
| 6,381,524 B1 | * | 4/2002 | Kuragaki et al. ............. 701/36 |

OTHER PUBLICATIONS

"Structure Computer Organization" by Andrew S. Tanenbaum, 3rd Edition, 1990, pp. 11–13.*

* cited by examiner

Primary Examiner—Xuan M. Thai
Assistant Examiner—Tim Vo
(74) Attorney, Agent, or Firm—Kenyon & Kenyon

(57) ABSTRACT

A computer system is provided with a scheme to making the input and output device provided in a computer in common for a plurality of operating system, in a multiple operating system control unit operating a plurality of mutually distinct operating systems on one computer system. The computer system includes a plurality of operating systems, and OS switching unit for switching a plurality of operating systems. The OS switching means makes reference to a preferential interrupt table on the basis of an interrupt factor for switching to corresponding operating system and calls interrupt processing means incorporated in the operating system.

10 Claims, 18 Drawing Sheets

FIG. 6

INTERRUPT ADDRESS TABLE  155

| INTERRUPT NUMBER | INTERRUPT START ADDRESS ||
| --- | --- | --- |
| | OFFICE WORK OS | REAL TIME OS |
| IRQ 0 | 0x00000400 | 0x00000600 |
| IRQ 1 | 0x00000420 | 0x00000620 |
| IRQ 2 | 0x00000440 | 0x00000640 |
| IRQ 3 | 0x00000480 | 0x00000680 |
| IRQ 4 | 0x000004A0 | 0x000006A0 |
| ⋮ | ⋮ | ⋮ |
| IRQ 15 | 0x000005C0 | 0x000007C0 |

FIG. 7

PREFERENTIAL INTERRUPT TABLE  156

| INTERRUPT NUMBER | OFFICE WORK OS | REAL TIME OS | COMMON |
| --- | --- | --- | --- |
| IRQ 0 | 0 | 1 | 0 |
| IRQ 1 | 1 | 0 | 0 |
| IRQ 2 | 0 | 1 | 1 |
| IRQ 3 | 1 | 0 | 1 |
| IRQ 4 | 0 | 1 | 0 |
| ⋮ | ⋮ | ⋮ | ⋮ |
| IRQ 15 | 0 | 1 | 0 |

SWITCH TABLE 200

| SWITCH NUMBER | ATTRIBUTE |
|---|---|
| #0 | RIAL TIME OS |
| #1 | RIAL TIME OS |
| #2 | OFFICE WORK OS |
| #3 | COMMON |
| #4 | COMMON |
| : | : |
| #n | COMMON | ns # COMPUTER SYSTEM WITH MULTIPLE OPERATING SYSTEM OPERATION

BACKGROUND OF THE INVENTION

1. Field of the Invention

The present invention is directed to a data inputting and outputting method to a peripheral devices in a computer system operating with a plurality of operating systems on a single processor, and is related to a control method for using the same peripheral device in common for a plurality of operating systems in common.

2. Description of the Related Art

In normal computer, one operating system is operated. The operating system manages resources of the computer, such as a processor, a memory and a secondary storage device and performs resource scheduling so as to operate the computer efficiently. Here, there are various kinds of operating systems. One is superior in batch process, another is superior in GUI such as an office work, the other is superior in a real time process. In order to bring out feature of a plurality of operating systems, there is a needs to execute a plurality of operating systems simultaneously on the single computer. For example, in case of a large size computer, it has been demanded to operate an operating system executing an on-line process associated with an actual business or an operating system for development. Also, it is demanded to operate an operating system provided with GUI and an operating system superior in real time characteristics.

As a mechanism for operating a plurality of operating systems on one computer, there is a virtual computer system (OS Series Vol. 11, VM, Tomoo OKAZAKI, Kyoritsu Shuppan K.K.) which has been realized in a large size computer, in the virtual computer system. A virtual computer control program occupies and manages all hardware and make it virtual to form the virtual computer. A control portion forming the virtual computer makes a physical memory, an input and output device, an external interrupt and so forth virtual. For example, divided physical memory behave as if a physical memory starting from zero address for the virtual computer. Unit numbers identifying the input and output device are also made virtual. Furthermore, by dividing a storage region of a magnetic disk to realize even making a magnetic disk drive virtual.

On the other hand, as a technology for providing interface for a plurality of operating system in one computer, there is a micro kernel. In the micro kernel, an operating system server for providing operating system function to be shown to the user on micro kernel, is established. The user utilizes a resource of the computer via the server. By providing servers for each operating system, it becomes possible to provide various operating system environments for the user.

For example, in case of a vehicle mounting navigation system, importance is given for a real time characteristics for instantly responding to variation of external environment and a reliability as to not to stop the system. Therefore, a real time operating system (real time OS) having a compact module construction with high interruption response is frequently used. However, the real time OS cannot be said to have superior interface with a person, while it gives importance for real time characteristics and reliability. On the other hand, an office work operating system (general purpose OS) to be typically used in typical personal computer (PC) is provided an environment for directly operating a display, such as GUI to provide superior human interface. Therefore, a demand to use a user interface of the general purpose OS even in the field where the real time OS has been used conventionally, is growing. However, since the general purpose OS takes interactive process with the person, it gives greater importance for a throughput of the process rather than response characteristics to interrupt process and thus is possible to execute a process with maintaining interrupt inhibiting condition for a relatively long period. On the other hand, in comparison with the real time OS having compact construction, it cannot be said comparable in reliability.

However, similarly to a system for operating a plurality of virtual computers (operating systems) in parallel on the large size computer, if the general purpose OS and the real time OS can be operated in the same computer system in a build-in system to switch the operating system as required, it may be possible to achieve both of superior used interface and real time characteristics and reliability. Considering improvement of performance of the microprocessor, operating a plurality of operating systems in one computer system has not been a technology permitted only the large size computer.

While it is required to be adapted for multiple users in the large computer, whereas a built-in equipments may be required to be at least adapted to a single user in the build-in equipments. Therefore, when the real time OS and the general purpose OS are operated in the single system, a simplest operating system switching method in consideration of importance of respective operating systems, if a process to be executed in the real time OS is present, to operate the real time OS preferentially and to operate the general purpose OS when the task to be executed on the real time OS is not present, is applicable. In such switching method the operating systems, a method of switching of the operating system by discriminating the interrupt number generated, by statically determining the operating system receiving the interrupt demand per input and output devices in inputting and outputting with the peripheral device. For example, when the foregoing method is applied to the vehicle mounted navigation system, the operating system is switched so that an interrupt handler of the real time OS is actuated for the interrupt from the sensor necessary for determining the position and an interrupt handler of the general purpose OS is actuated for interrupt from a display controller. However, since the reliability of the general purpose OS is not necessarily high, in the shown application, process of the general purpose OS is stopped, the user interface becomes impossible to use to lower reliability of the overall vehicle mounted navigation system. In order to solve the foregoing problem, the process may be divided to assign the process which is desired to never be interrupted to the real time OS side and to assign the process permitting interruption to the general purpose OS side. However, if the input and output process for the user interface is process on the side of the real time OS, introduction of the general purpose OS superior in user interface becomes meaningless. Therefore, it becomes essential to permit use of the input and output device from a plurality of operating systems, namely from both of the general purpose OS and the real time OS. Therefore, a problem is encountered in that it is insufficient to statically determine the operating system to execute the input and output process from the interrupt number as set forth above, and cannot be applicable for practical use.

SUMMARY OF THE INVENTION

An object of the present invention to provide a scheme to making the input and output device provided in a computer in common for a plurality of operating system, in a multiple operating system control unit operating a plurality of mutually distinct operating systems on one computer system.

In order to accomplish the above mentioned object, According to the first invention, a computer system including a plurality of operating systems, and an OS switching means for switching a plurality of operating systems, characterized in that said OS switching means makes reference to a preferential interrupt table on the basis of an interrupt factor for switching to corresponding operating system and calls interrupt processing means incorporated in said operating system for making the input and output device provided in the computer system in common for a plurality of operating systems.

According to the second invention, a computer system having a plurality of operating systems and OS switching means for switching a plurality of operating systems, characterized by including peripheral device to be common for a plurality of operating systems, data inputting and outputting server for inputting and outputting data with the peripheral device to be used in common, providing in one of the operating systems, data inputting and outputting client for inputting and outputting data with the operating system other than said one operating system, requesting inputting and outputting data to said data inputting and outputting server and executing inputting and outputting of data by receiving a result of data inputting and outputting with the peripheral server in the data inputting and outputting server.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 6 is an illustration showing a construction of the interrupt address table;

FIG 7 is an illustration showing a construction of a preferential interrupt table;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Embodiments of a computer system according to the present invention will be discussed with reference to the drawings.

Figure 1:
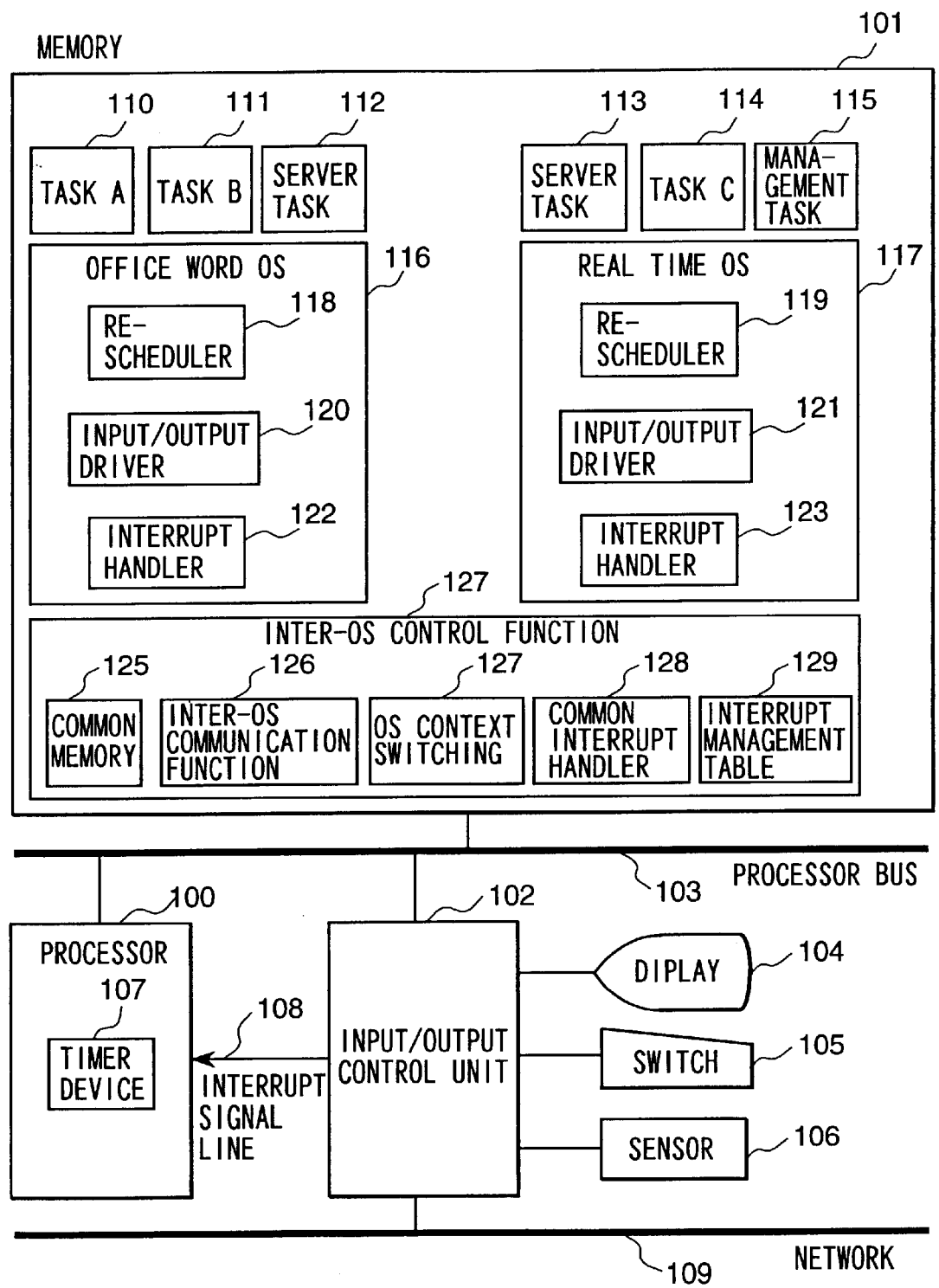
FIG. 1 is an illustration showing a system construction in the first embodiment of the present invention.

An overall construction in the first embodiment of the computer system according to present invention is illustrated in FIG. 1. Normally, a computer system is constructed with a processor 100, a memory 101, an input and output control device 102, a display 104, a switch 105, a sensor 106 and so forth. The processor 100, the memory 101 and the input and output control device 102 are connected by a processor bus 103. The processor 100 is a microprocessor for operating a plurality of operating systems. The memory 101 stores operating systems 116 and 117, task programs 110 to 115 operated on respective operating systems, input and output driver programs 120 and 121 for respective operating systems, interrupt handler programs 122 and 123, and inter-OS control function program 124. These programs are read from the memory 101 and executed by the processor 100.

The input and output control device 102 is connected with a display 104 as an image display device, a switch 105 for receiving a command from a user, a sensor 106 for detecting variation of peripheral environment and so forth. On the other hand, upon realizing a factory/plant controlling or built-in computer system, a network 109 may be connected to the input and output control device 102. To the network 109, an input and output equipment, such as a communication equipment and so forth, is connected. It should be noted that among input and output devices 104 to 106 connected to the input and output control device 102, any one or all of the input and output devices may be omitted in some system configuration. Furthermore, wide variety of input and output devices may be connected for notifying completion of input and output operation and so forth. In FIG. 1, while the interrupt signal line 108 and the processor bus 103 are illustrated as separate devices for the purpose of illustration, the interrupt signal line is a part of the processor bus 103, in practice. Within the processor 100, a timer device 107 is provided to cause an internal interrupt per a given period. An interrupt caused by the timer device 107 is used for time measurement of the operating system or the like.

The processor 100 is provided with a function for masking an external interrupt command input through the interrupt signal line 108 and an internal interrupt command from the timer device 107 and so forth. The masking of interrupt is a function for delaying a particular interrupt until masking of interrupt is released by a program. Typically, as the interrupt masking functions, the following three kinds are present.

(1) All Interrupt Mask: All of interrupts are masked.
(2) Individual Interrupt Mask: Each individual interrupt is masked.
(3) Interrupt Level Mask: Level is set for each interrupt for masking interrupt lower than or equal to a designated level.

Depending upon kind of the processor 100, interrupt masking of a combination of the foregoing (1) and (2) or a combination of (1) and (3) may be provided, frequently. When the processor having the latter combination is employed, the interrupt level is assigned depending upon importance and minimum response period of the corresponding input and output device. For example, an interrupt from a network requiring a short response period is set at higher level than that of the interrupt from the switch 105, the storage device 106 and so forth.

In the shown embodiment, discussion will be given for the case where two operating systems 116 and 117 are present in the computer system. The operating systems 116 and 117 execute tasks 110 to 115 using memory assigned for each operating system and a resource of the processor. While FIG. 1 shows an example where number of operating systems is two and total number of the tasks is six, it is possible to load the operating systems or tasks in greater or smaller number than that illustrated. While the shown embodiment does not consider dynamic variation of number of the operating systems, it is possible that each operating system dynamically generate and delete the takes. Furthermore, in the shown embodiment, it is assumed that the operating system 116 is the general purpose OS which is adapted for wordprocessing, data processing and so on and the operating system 117 is the real time OS which requires real time response, such as computer games, navigation system and so forth. However, the technology descried in the present invention is applicable for any kind of the operating systems. The tasks 110 to 112 are tasks to be executed by the general purpose OS, and the tasks 113 to 115 are real time tasks to be executed by the real time OS. Also, the following discussion will be given with an assumption that preferential order of interrupt of the real time OS is higher than that of the general purpose OS in order to guarantee a response period in the real time OS. In the assumption, when any one of the tasks of the real time OS is in execution, the real time OS 116 uses the resource of the processor. When all of the tasks are in idling condition or waiting condition, the context is switched to the general purpose OS so that the general purpose OS uses the resource of the processor.

The inter-OS control function 124 is provided for operating the general purpose OS 116 and the real time OS 117 in cooperation with each other. The inter-OS control function 124 includes a common memory 125 accessible from both of the general purpose OS and the real time OS, an inter-OS communication function 126 for performing transfer of message between the general purpose OS and the real time OS, an OS context switching function 127 for switching executing environment of the general purpose OS and the real time OS, a common interrupt handler 128 for distributing the generated interrupt commands to respective operating systems, and a preference management table 129 storing the operating systems corresponding to the interrupt demands or interrupt start addresses.

The common memory 125 intends the realize high speed data exchange between the operating systems and can read and write out and in by both of the general purpose OS and the real time OS. Here, in order to avoid conflict of data, it is desirable to exclusively access the common memory using a semaphore function. The inter-OS communication function 126 prepares a message queue corresponding to respective operating system for transferring the message between respective operating systems. The common interrupt handler 128 initially call upon generation of the interrupt demand to determine the operating system per interrupt number stored in the preferential interrupt table 129 to call the corresponding interrupt handler 122 and 123. The OS context switching function 127 switches context as judged that switching of the operating system is necessary in response to the interrupt demand or calling of inter-OS control function. The interrupt management table 129 stores the operating system information, in which the interrupt handler called per interrupt number belongs, and start address information of the interrupt handler per operating system. In the conventional method, the interrupt management table 129 statically determines upon starting up of the system. Therefore, the content could not be re-written during system operation. In the shown system, by providing re-writing means for re-writing the interrupt management table 129 even during system operation, common use of one input and output device with a plurality of operating systems is enabled.

The operating systems 116 and 117 has the input and output drivers 120 and 121 for processing data input and output with the input and output device and the interrupt handlers 122 and 123 for receiving interrupt demand from the input and output devices. The interrupt handlers 122 and 123 are called from the common interrupt handler 128. One of the interrupt handlers 122 and 123 called by the common interrupt handler 128 executes interrupt processing program defined by the user. The input and output drivers 120 and 121 provide interfaces for controlling the input and output devices and provide functions for inputting and outputting data by reading and writing data from and in the input and output device and controlling the input and output device. Re-schedulers 118 and 119 initiate operation in the case where task has to be switched associating with generation, deletion, stopping, and restoring of task, external interrupt or internal interrupt. The re-scheduler stores execution environment (program counter, status register, general purpose register and so forth) of the task executed immediately before in a task management table, determines to be newly executed, takes out the execution environment from the task management table to set in respective registers to execute the selected task.

Figure 2:
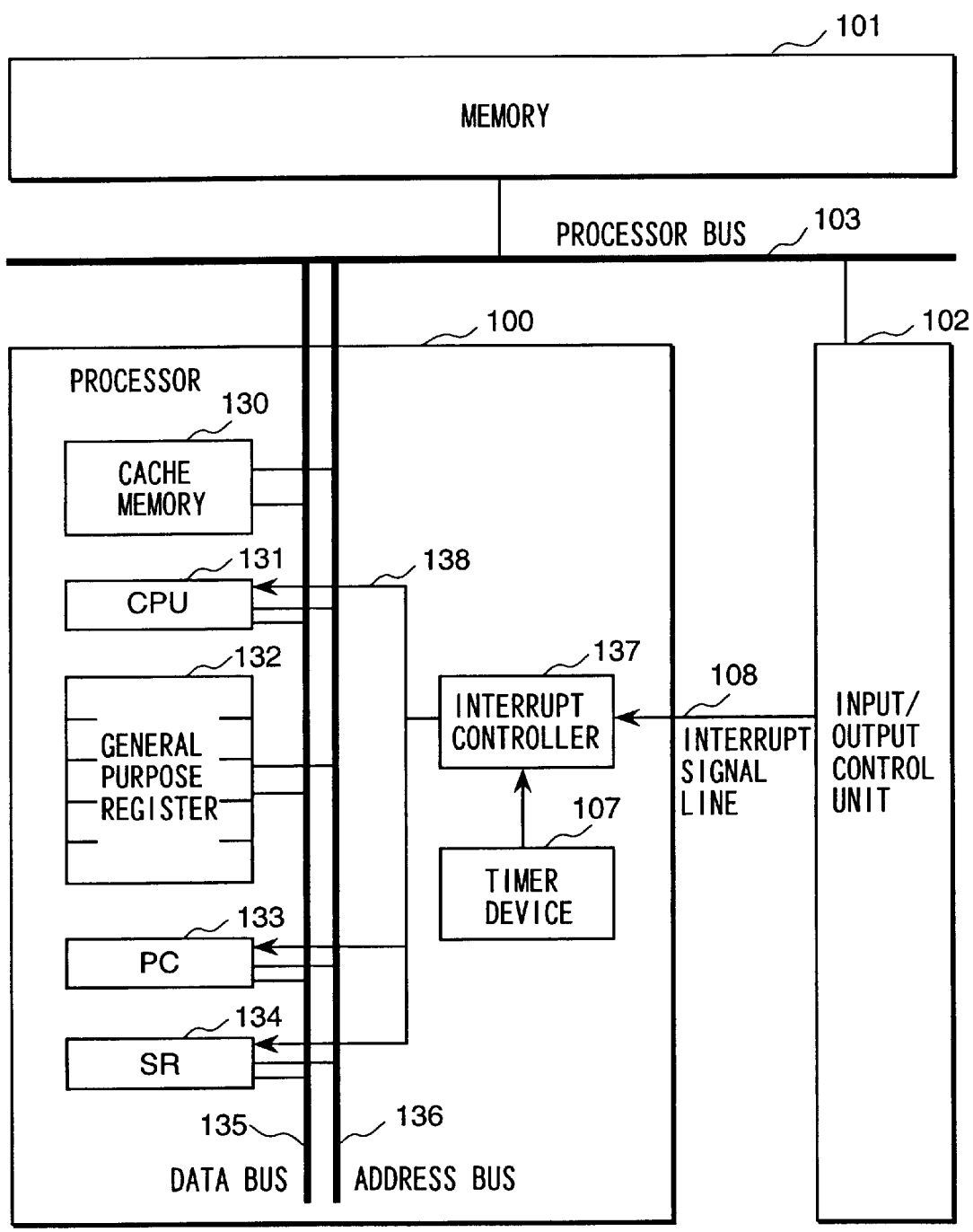
FIG. 2 is an illustration showing a hardware construction of a computer system.

FIG. 2 shows an example of internal construction of the processor premised in the present invention. A cache memory 130 is a buffer storage device for temporarily storing data or instruction on the memory 101. CPU 131 is an arithmetic circuit and sequentially executes instructions present on the memory 101 or the cache memory 130. Upon execution of the instruction, a general purpose register 132 temporarily storing the result of arithmetic operation, a program counter 133 for storing an execution instruction address and a status register 134 for storing execution status. The cache memory 130, CPU 131, the general purpose register 132, the program counter 133, the status register 134 are connected with each other by a data bus 135 for transferring data and an address bus 136 performing address designation.

The interrupt signal line 108 and the timer device 107 are connected to an interrupt controller 137. The interrupt controller 137 has a function for generating interrupt state signal 138 with respect to CPU 130. The interrupt state signal 138 is a signal line indicating what kind of interrupt is currently occurred on the processor 100. Normally, the status register 134 has information relating to current interrupt mask to determine whether interrupt designated by the interrupt status signal 138 is accepted or not. Upon accepting interrupt, the interrupt controller 137 re-writes the program counter 133, the status register 134 and so forth to execute corresponding interrupt-processing program.

Figure 3:
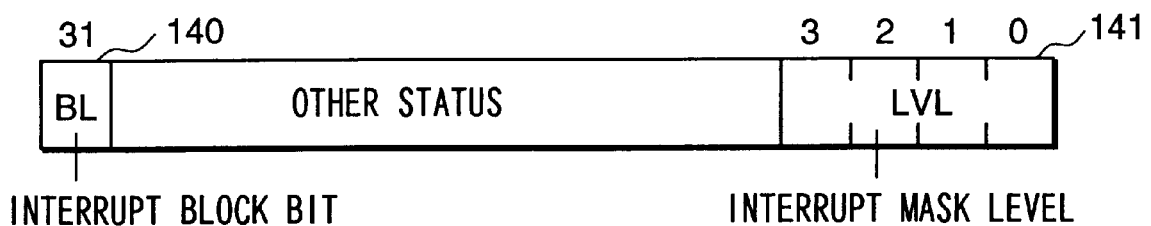
FIG. 3 is an illustration showing a status register in the case where an interrupt level mask function is provided.

An example of structure of the status register 134 is shown in FIG. 3. Here, an example of the case where all interrupts masking function and interrupt level masking function are provided in the processor 100. In the example of FIG. 3, the status register 134 has an interrupt block bit 140 and an interrupt mask level field 141. When the interrupt block bit 140 is ON, all interrupts to the processor 100 is masked. The interrupt mask level field 141 shows the current interrupt mask level value, and interrupt level lower than or equal to this level is not accepted. In case of the example shown in FIG. 3, the interrupt mask level field 141 has a length of four bit length. Therefore, sixteen kinds in total of the mask levels can be designated (normally, the interrupt level 0 represent "interrupt does not occur", and thus fifteen kinds in practice). By varying the bit number of the interrupt mask level field 141, kind of the interrupt level to accept can be increased and decreased.

Figure 4:
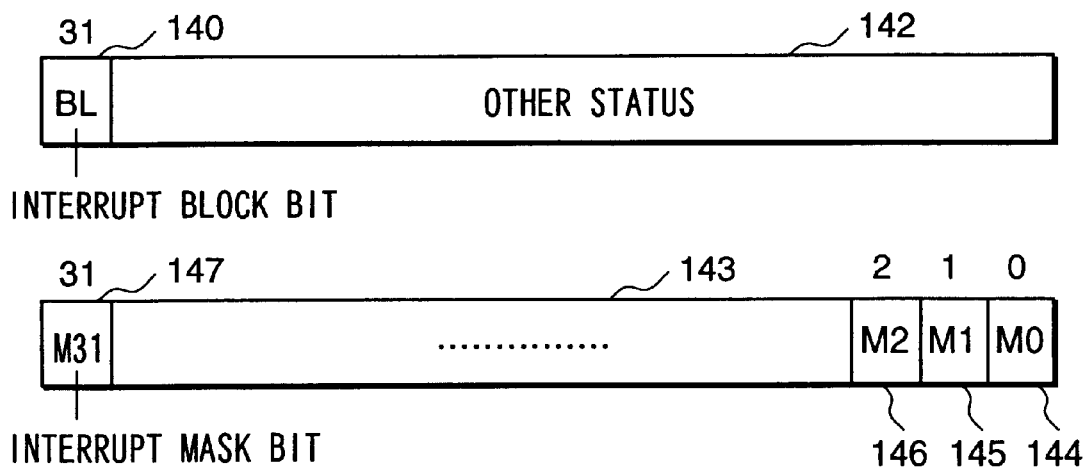
FIG. 4 is an illustration showing a status register in the case where an individual interrupt mask function is provided.

FIG. 4 shows the status register 134 for the case where the processor 100 is provided with all interrupt masking function and individual interrupt masking function. In this example, the status register 134 is constructed with two registers (an execution status register 142 and in interrupt masking register 143). Similarly to FIG. 3, the interrupt block bit 140 in the execution status register 142 is provided. Interrupt mask bits 144 to 147 in the interrupt masking register 143 correspond to interrupt separately. When any one of the interrupt mask bits is turned ON, reception of the corresponding interrupt is prohibited. The example of status register shown in FIG. 3 is special example of the status register 134 of FIG. 4. For example, a state where only interrupt mask bit 144 is ON, is referred to as level 1. When two of the interrupt mask bits 144 and 145 are ON, the state is referred to as level 2. When three of the interrupt mask bits 140 to 146 are ON, the state is referred to as level 3, . . . for establishing correspondence. Therefore, in the following disclosure, the status register 134 will be discussed to have the construction shown in FIG. 4.

In general processor, upon reception of interrupt, the interrupt block bit 140 is automatically re-written to ON by hardware. As required, the interrupt processing program re-writes the interrupt block bit 140 to OFF to enable accepting interrupt. On the other hand, it is also possible to temporarily re-write the contents of the interrupt block bit 140 and the interrupt mask register 143 by the operating system and the task to place the system to wait for reception of a particular interrupt. The interrupt masking function is used for realizing exclusive control and avoiding occurrence of the same interrupt during execution of interrupt process.

Figure 5:
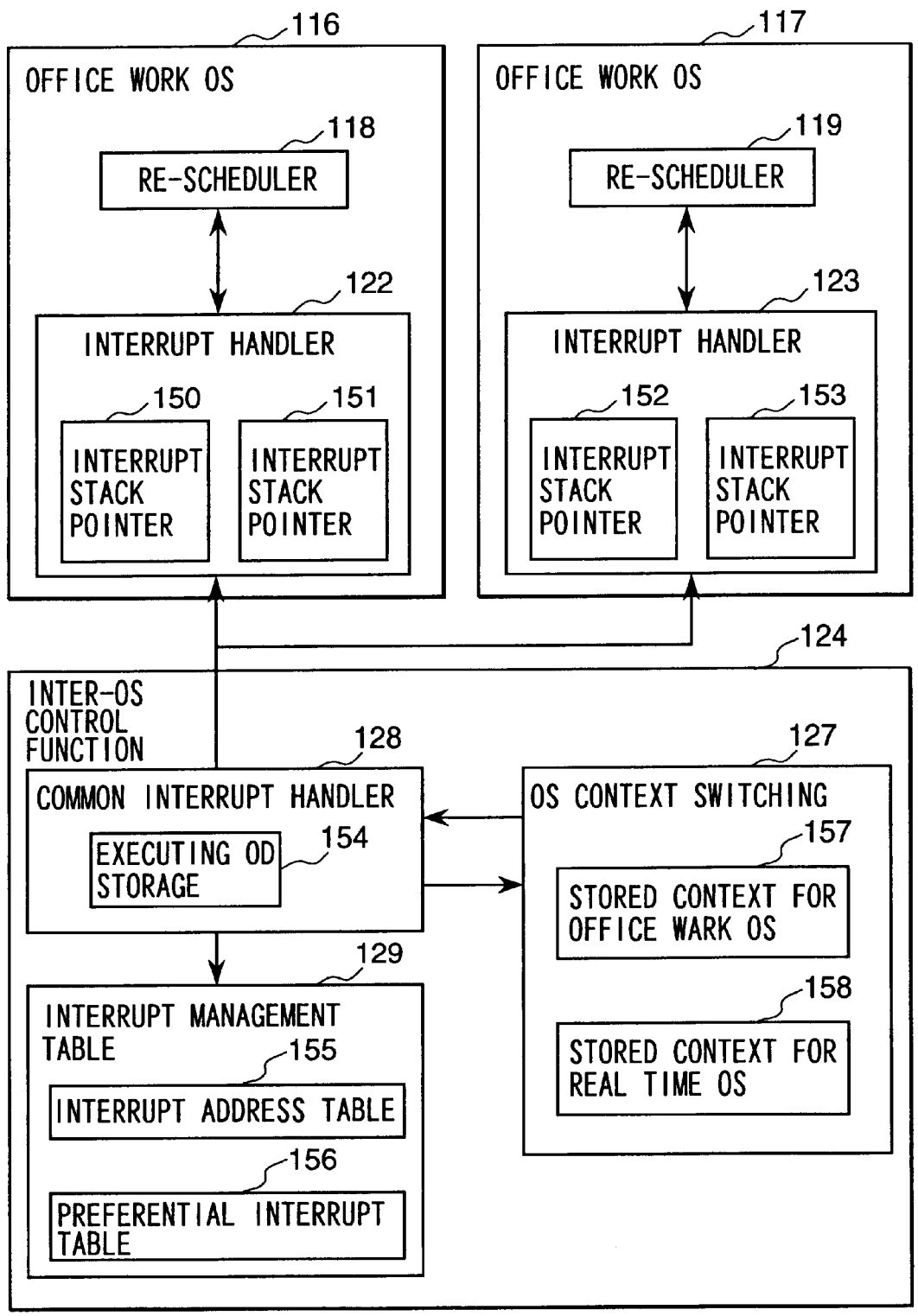
FIG. 5 is a first illustration showing a detail of an interrupt processing program.

FIG. 5 shows detail of the interrupt handlers 122 and 123, the common interrupt handler 128, the OS context switching function 127 and the interrupt management table 129.

The interrupt handler 122 and 123 have interrupt stacks 151 and 153 respectively as regions for storing register and so forth upon occurrence of interrupt and storing a temporary parameter. The interrupt stacks 151 and 153 are provided for storing register value immediately before occurrence of interrupt and returning the register value to the original value after completion of the interrupt process, upon occurrence of interrupt. Some kind of processor 100 to be used, a function to automatically switch the register upon occurrence of interrupt and to return to the register before switching after the interrupt process. However, in consideration of the system permitting multiple interrupts, stack becomes necessary even in using such hardware (when interrupt having higher preference occurs during process of interrupt, the newly occurred interrupt process is executed preferentially, and then has to return to the original interrupt process). The interrupt handlers 122 and 123 has interrupt stack pointers 150 and 152 as pointers showing what region is used in the interrupt stacks 151 and 153. The interrupt handlers 122 and 123 store execution environment (register and so forth) using the interrupt stack pointer to execute necessary interrupt process. After completion of the interrupt process, the execution environment before occurrence of interrupt is resumed to continue originally executed program.

The common interrupt handler 128 has a function for distributing occurred interrupt to the interrupt handlers 122 and 123. Therefore, the common interrupt handler 128 has an executing OS storage parameter 154 as a region for storing which of the general purpose OS 116 and the real time OS 117 is the operating system currently executed. For example, assuming that the general purpose OS is in execution at the time of FIG. 5, "general purpose OS" is stored in the executing OS storage parameter 154, in this case. Of course, since it is quite inefficient to store the character string "general purpose OS" in the executing OS storage parameter 154, it may be stored in a form of integer, such that 0 is stored if the general purpose OS is in execution and 1 is stored if the real time OS is in execution.

The interrupt management table 129 has a preferential interrupt table 156 indicating which interrupt handler of one of the operating system is to be actuated and an interrupt address table 155 indicating a start address of the interrupt handlers included in respective operating systems. The preferential interrupt table 156 is constructed with a correspondence table indicating which of the operating systems processes the individual interrupt as shown in FIG. 7, for example to request process to the interrupt handler of the operating system, for which the flag 1 is stored. Furthermore, for interrupt from the input and output device common for a plurality of operating systems, flag is set to 1, and not common interrupt, flag 0 is stored. In the shown embodiment, assuming that sixteen kinds of interrupt factors are present, the interrupt correspondence table 156 is formed with sixteen entries (IRQ#0 to IRQ#15). In this disclosure, it is premised a method for storing a flag in a preferential driver table 160, it may be realized by any method by storing some identifiable information. The interrupt address table 155 is a table holding start address of the interrupt handler included in each operating system as shown in FIG. 6, for example.

In the present invention, in order to achieve the object to use one input and output equipment for a plurality of operating systems in common, a mechanism for dynamically varying the operating system to be actuated from the interrupt demand received by the common interrupt handler 128. The content of the preferential interrupt table 156 is updated depending upon the user operation and use condition of the input and output equipment. The common interrupt handler 128 operates to call interrupt handler according to the content of the preferential interrupt table 156. In further detailed discussion, the common interrupt handler 128 make reference to the executing OS storage parameter 154 to make judgment of the kind of the currently executed operating system. If the kind of the operating system does not match with the operating system to be assigned obtained from the preferential interrupt table 154, switching of the operating system is requested to the OS context switch module 127. Upon completion of switching of the operating system or if the operating system matches and thus switching is unnecessary, process is requested to the interrupt handler of the corresponding operating system. It should be noted that the executing OS storage parameter 154 is made reference to even from the OS context switch module 127. The internal structure having respective modules in the inter-OS control function program, is not limited to that occupied by individual modules but can be common in respective modules as required.

The OS context switch module 127 is actuated when the operating systems are to be switched as a result of calling of the inter-OS control function or occurrence of interrupt. In order to switch between the operating systems, the region for storing the execution environment (namely, register value) is provided. In the drawing, as the region for storing the execution environment of the general purpose OS in the drawing, a storage context for general purpose OS 157 is prepared, and as a region for storing execution environment of the real time OS, a storage context 158 for real time OS is prepared. The OS context switch module 127 stores the execution environment in the storage context corresponding to the currently executed operating system upon switching of the context. Next, the execution environment is read out from another storage context to set in the register of the processor 100. By this, switching of the operating system can be performed. Subsequently, discussion will be given for process flow of the OS context switch module 127, the common interrupt handlers 128 and the interrupt handler 122 among the modules shown in FIG. 5. Concerning the interrupt handler 123, since it has the same flow as the interrupt handler 122, discussion will be omitted.

Figure 8:
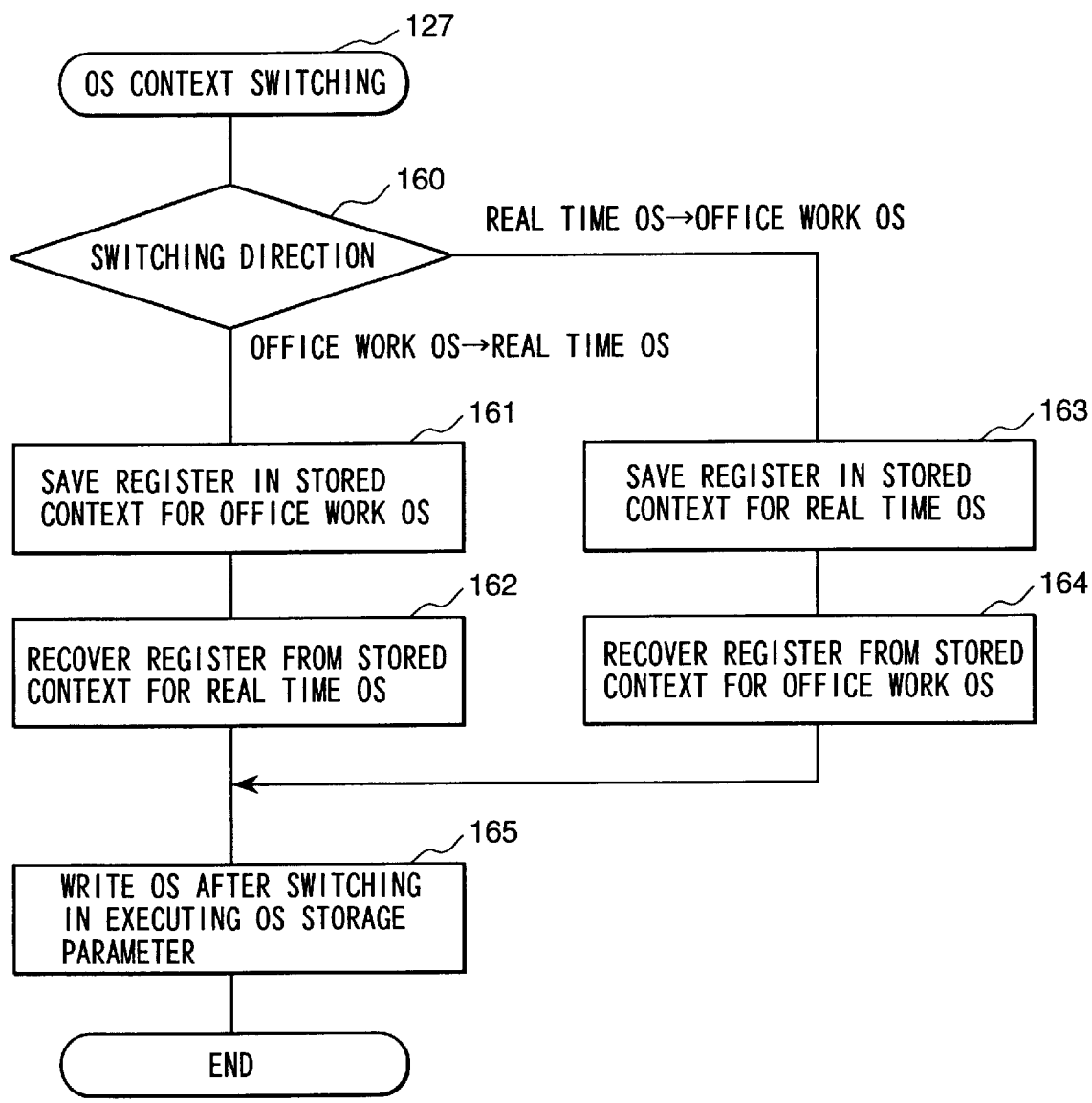
FIG. 8 is an illustration showing a process flow of an OS context switch module.

FIG. 8 is a process flow of the OS context switch module 127. The OS context switch module 127 is called only when the operating systems to be executed are to be switched. Checking whether switching is necessary or not, is performed before calling. Accordingly, with reference to the executing OS storage parameter 154, check is performed as to which operating systems switching is to be made (process 160). Here, upon switching from the general purpose OS 116 to the real time OS 117, the value of the register being used is temporarily stored in the storage context 157 for the general purpose OS (process 161). Then, by resuming the execution environment from the storage context 158 for the real time OS to set in the register (process 162), the real time OS can be re-executed from the temporarily stored condition. Upon switching from the real time OS to the general purpose OS, conversely, the value of the register being used is temporarily stored in the storage context for the real time OS (process 163). Next, the register 157 is resumed from the storage context 157 for general purpose OS (process 164). In either case, finally, the kind of the operating system after switching is written in the executing OS storage parameter 154 (process 165).

Figure 9:
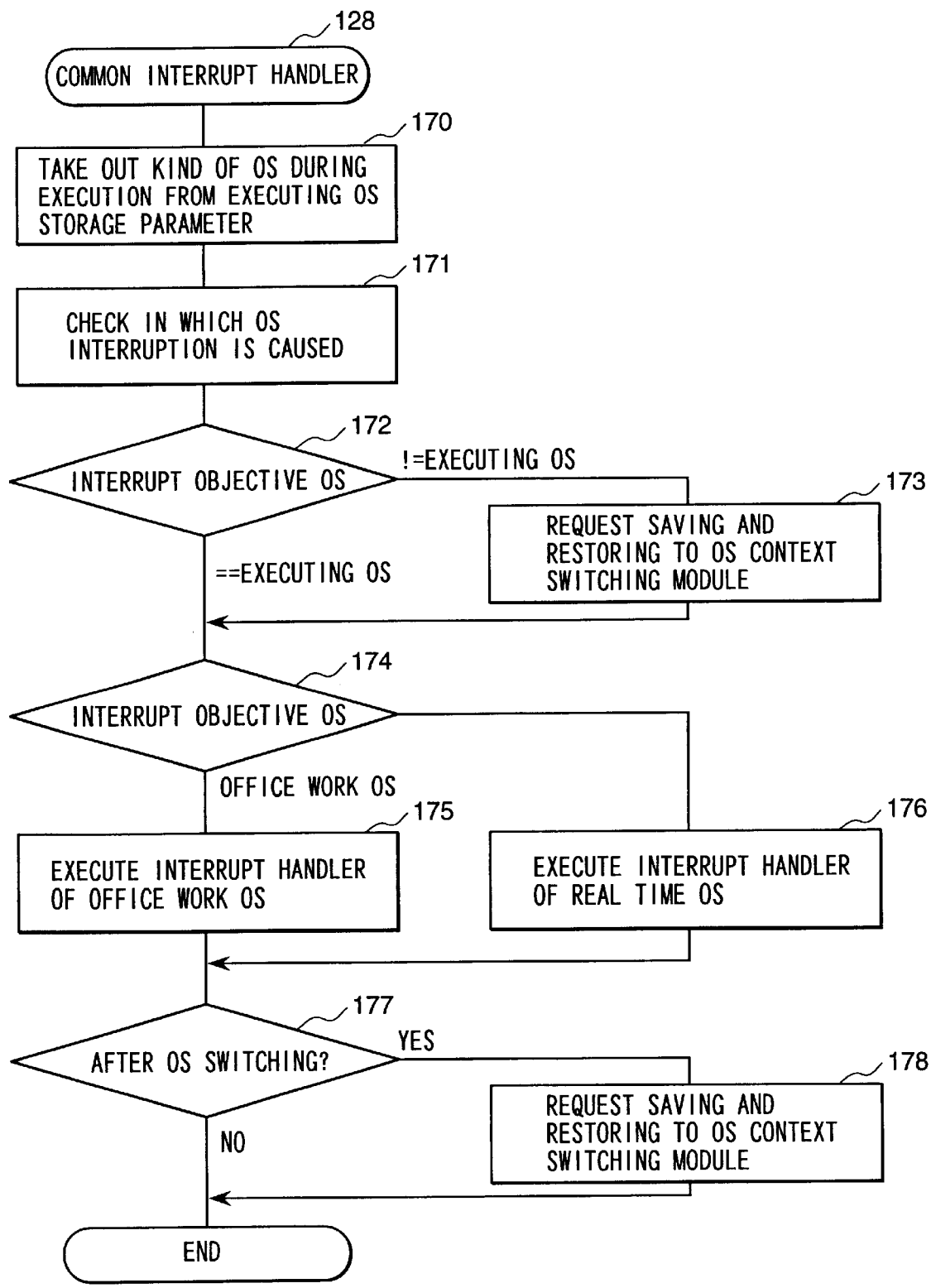
FIG. 9 is a first illustration showing a process flow of a common interrupt handler.

FIG. 9 shows the process flow of the common interrupt handler 128. In general, in the computer system controlled by a single operating system, all of interrupts are once processed by a module called as interrupt handler, then is distributed to respective programs. However, in case of the computer system operating a plurality of operating system as discussed in the shown embodiment, all interrupts are received by the common interrupt handler further before to distribute the interrupts to the interrupt handlers of the corresponding operating systems. Upon distribution of interrupts to respective operating systems, upon occurrence of interrupt, it is possible that the operating system other than objective for interrupt is in execution. In this case, it becomes necessary to switch to the operating system corresponding to interrupt. The common interrupt handler also has such function.

The common handler 128, at first, takes out the content of the executing OS storage parameter 154 to check whether the operating system currently executed is the general purpose OS 116 or the real time OS 117 (process 170), upon occurrence of interrupt. Next, reference is made to the preferential interrupt table 156 to attain which of the interrupt handler of the operating systems is to be actuated by the generated interrupt demand (process 171). Considering the case where the value in the preferential interrupt table 156 shown in FIG. 6 is used, the operating system corresponding to the value can be attained in such a manner that when the interrupt IRQ#0 occurs, the real time OS, when the interrupt IRQ#1 occurs, the general purpose OS 117, . . . when the interrupt IRQ#15 occurs, the real time OS 117. Next, check is performed whether the obtained interrupt objective operating system matches with the operating system in execution or not (process 172). If the interrupt demand is not for the currently executed operating system, the operating system has to be switched once. This switching process is performed by requesting switching to the OS context switch module 127 (process 173). Next, check is performed whether the interrupt objective operating system is the general purpose OS 116 or the real time OS 117 (process 174). If the object is the general purpose OS 116, the interrupt handler 122 of the general purpose OS is actuated with reference to the interrupt address table 155 (process 175). If interrupt is caused in the real time OS 117, reference is made to the interrupt address 155, similarly, the interrupt handler 123 of the real time OS is actuated (process 176). In general, when switching of task has to be performed in the interrupt process, the interrupt handler 122 and 123 calls the re-schedulers 118 and 119 so as not to return the control to the common interrupt handler 128. However, when task switching does not occur, the process of the interrupt handler is terminated. At this time, the interrupt handlers 122 and 123 returns control to the common interrupt handler (discussed later in connection with FIG. 10), and the common interrupt handler resumes operation from process 177. Process 177 is a process for checking whether the operating systems are switched upon occurrence of interrupt. When the operating system is switched at process 173, the operating system has to be switched again to return to the original execution environment. Therefore, request is made to the OS context switch module 127 for execution of the switching process (process 178).

Figure 10:
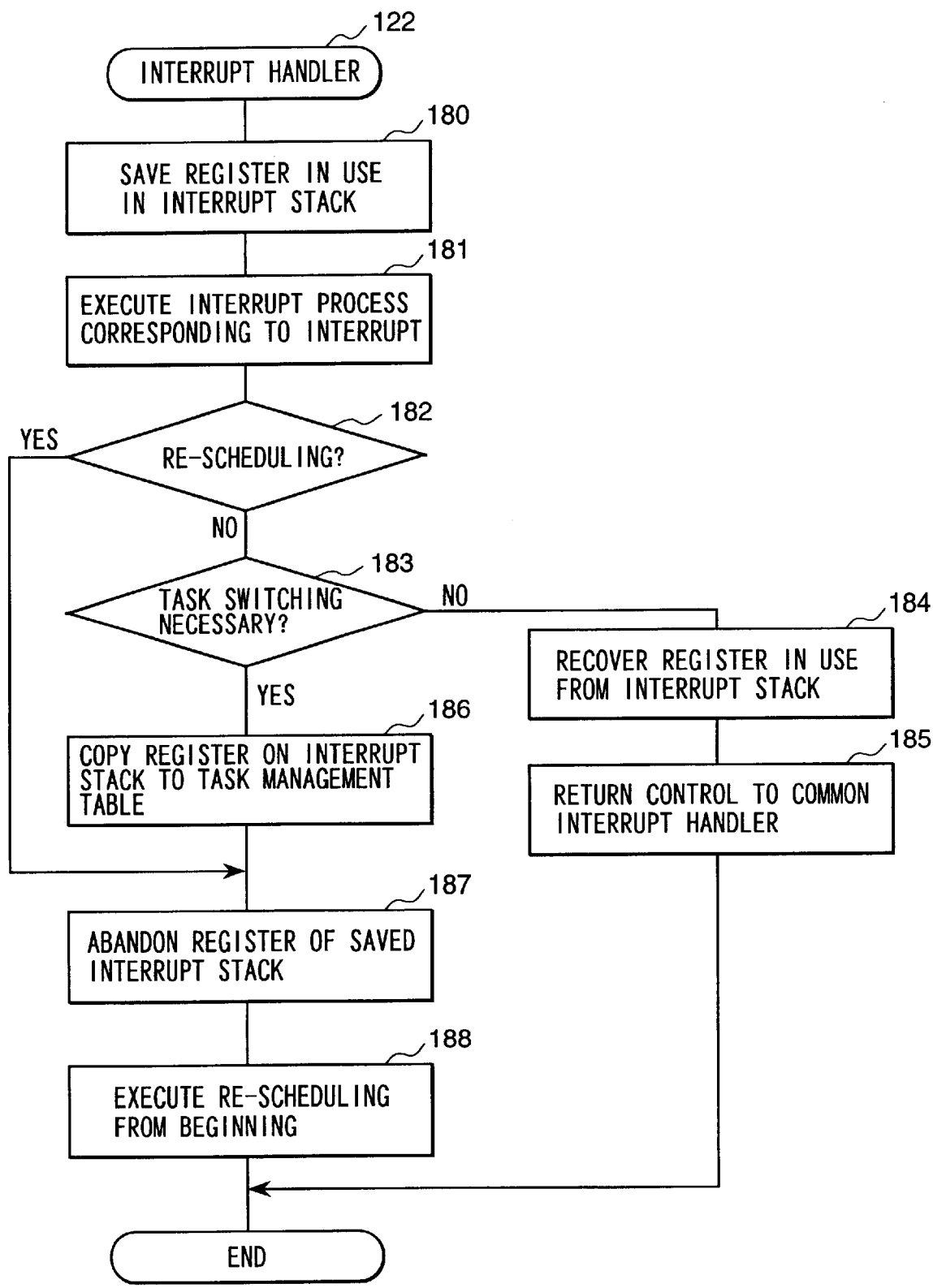
FIG. 10 is a first illustration showing a process flow of an interrupt handler.

FIG. 10 shows a process flow of the interrupt handler of the general purpose OS called from the common interrupt handler 128. At first, the register in use is temporarily stored in the interrupt stack 151 (process 180) to execute the interrupt process (process 181). Here, check is made whether the operating system is in re-scheduling or not (namely, whether the re-scheduler is in execution of the process or not) (process 182). In re-scheduling means that the take to be executed next is now in selection, and the task is not actually in execution/Accordingly, when the process of the operating system can be simplified, the re-scheduling in this case can be done again from the beginning. Namely, when judgment is made that the re-scheduling is current in execution, the temporarily stored register of the interrupt stack is abandoned (process 187) to actuate the re-scheduler 118 from the beginning (process 188). It should be noted that there is some cases, in which the task in execution is not necessary to be newly selected even when interrupt occurs during re-scheduling. In the shown system, even in this condition, rescheduling has to be performed from the beginning and thus is not efficient. Therefore, it is possible to employ a method to register the process (e.g. task initiation, termination and so forth) possibly influence for execution of the re-scheduler 118, occurring during re-scheduling in a queue. In this case, the process registered in queue before completion of re-scheduling, is executed aggregatingly. When this system is employed, it becomes unnecessary to re-do re-scheduling executed to the mid-way at every occurrence of interrupt. However, after aggregatingly executing the process stored in the queue, check has to be done again whether re-scheduling is to be performed or not. It should be noted that, in the shown embodiment, discussion will be given with the former system for simplification. However, when the latter system is employed, a flag indicative of re-scheduling being in process or not or a process queue may be prepared. In system call or so forth provided by the operating system, the process influencing for execution of the re-scheduler 118 is registered ion queue if re-scheduling is in execution. Furthermore, during process flow of re-scheduler 118, a module to aggregatingly executing the processes registered in queue is inserted.

When the interrupt handler 122 makes judgment that the re-scheduling is not in execution, the operating system should be in execution of certain task at that timing. Therefore, at first, check is made whether task switching is necessary or not (process 183). If switching of the task is unnecessary (currently executed task is the highest preferential order and is executable), the process of the interrupt handler 122 is terminated with no change. Therefore, the register value temporarily stored in the interrupt stack 151 is recovered (process 184) and control is returned to the common interrupt handler (process 185). If judgment is made that switching of the task is necessary, the value of the register temporarily stored in the interrupt stack 161 is copied to the task management table (process 186), the temporarily stored register of the interrupt stack is abandoned (process 187) and then the re-scheduler 118 is actuated (process 188). It should be noted that if the process 100 is provided with a function to increase and decrease the value of the interrupt stack pointer 150 together with making reference to data on the memory 101, the processes 186 and 187 can be executed in a lump.

As set forth above, the method for using the input and output device in common for a plurality of operating systems by making reference to the preferential interrupt table 156 provided in the inter-OS control function 124, and actuating the interrupt handler after determination of the operating system to be operated. However, it is possible to occur the case where the operating systems cannot be uniformly determined from the interrupt number for some input and output device. For example, in an input and output panel of a vehicle mounted navigation system shown in FIG. 11, for example, a switch 105 for inputting a command by the user and a display 104 for displaying a result are provided. The switch 105 preferably includes a dedicated switch 190 for real time OS, which is used by only tasks provided in the real time OS 117, a dedicated switch 191 for office work and a common switch 192 which can be used in common from the tasks provided in both of the operating systems. By providing the dedicated switches per operating system, frequently used function can be fixedly assigned to the switches to attain a feature to improve operability. Furthermore, by assigning the function to the fixed switch, function name can be displayed on the button to improve identifiability. However, providing distinct interrupt number per switch is disadvantageous in viewpoint of constraint of number of interrupt signal lines and simplification of the hardware. On the other hand, by assigning the same interrupt number to the switches, it becomes impossible to determine which interrupt handlers of the operating systems is to be actuated upon depression of the switch. In order to solve this problem, a switch table 200 is provided in the common memory 125 provided in the inter-OS control function 124. In the switch table, information of the switch to be used by which operating system is stored per switch in FIG. 12, in the switch table, "real time OS", "general purpose OS" and "common" are stored. Of course, storing the character string in the table is quite inefficient, the information may be stored in a form of integer, such as if the operating system is real time OS, 0 is stored, if the general purpose OS, 1 is stored, and if common, 2 is stored.

Figure 13:
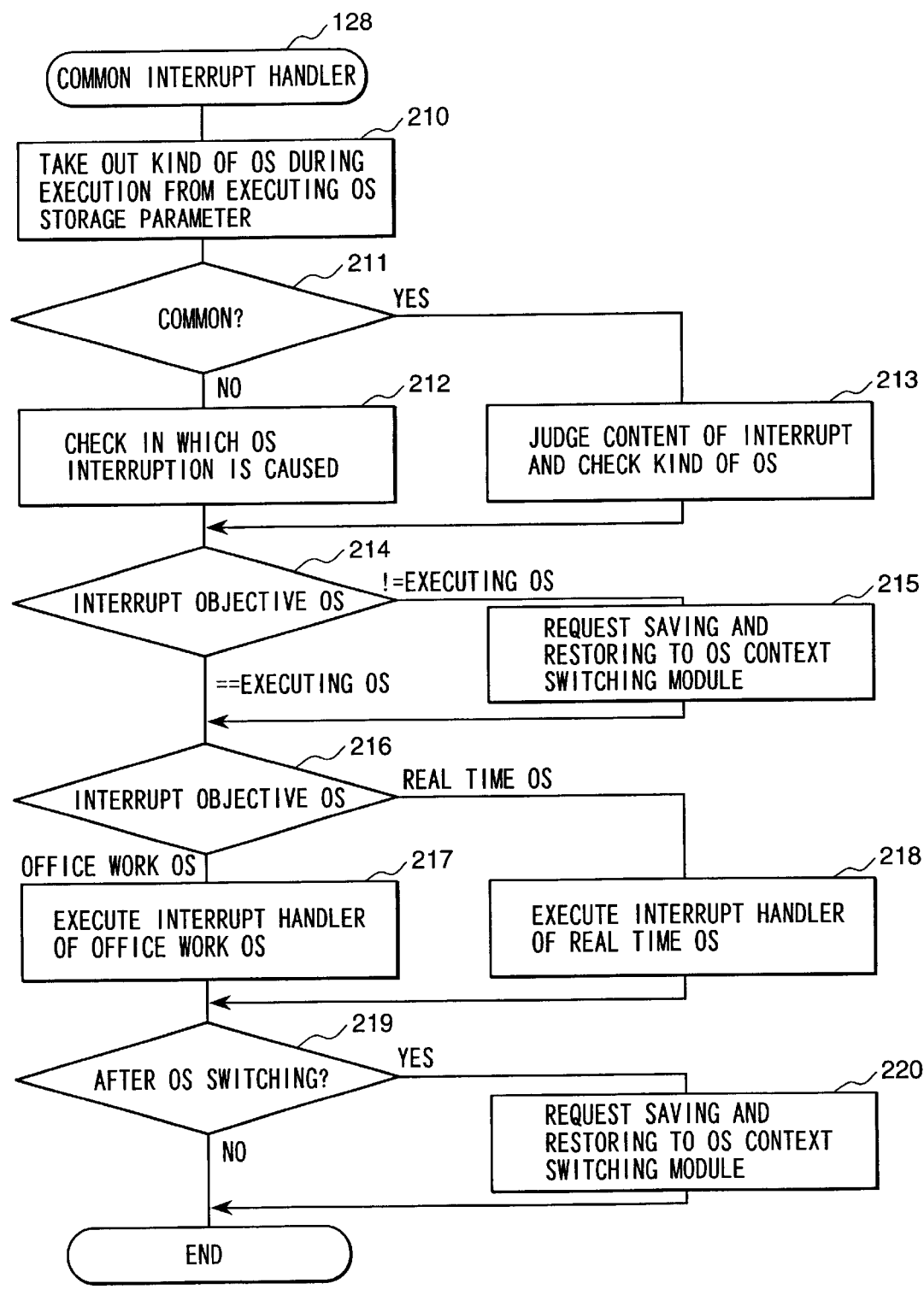
FIG. 13 is a second illustration showing the process flow of the common interrupt handler.

Next, a process flow of the common interrupt handler 128 using the input and output device in common for a plurality of operating systems using the foregoing switch table 200, will be discussed with reference to FIG. 13. The process discussed herein is applicable not only for the switch but also for other input and output device which require determination which operating systems is to be actuated by making judgment of the content of interrupt.

Figures 11, 12:
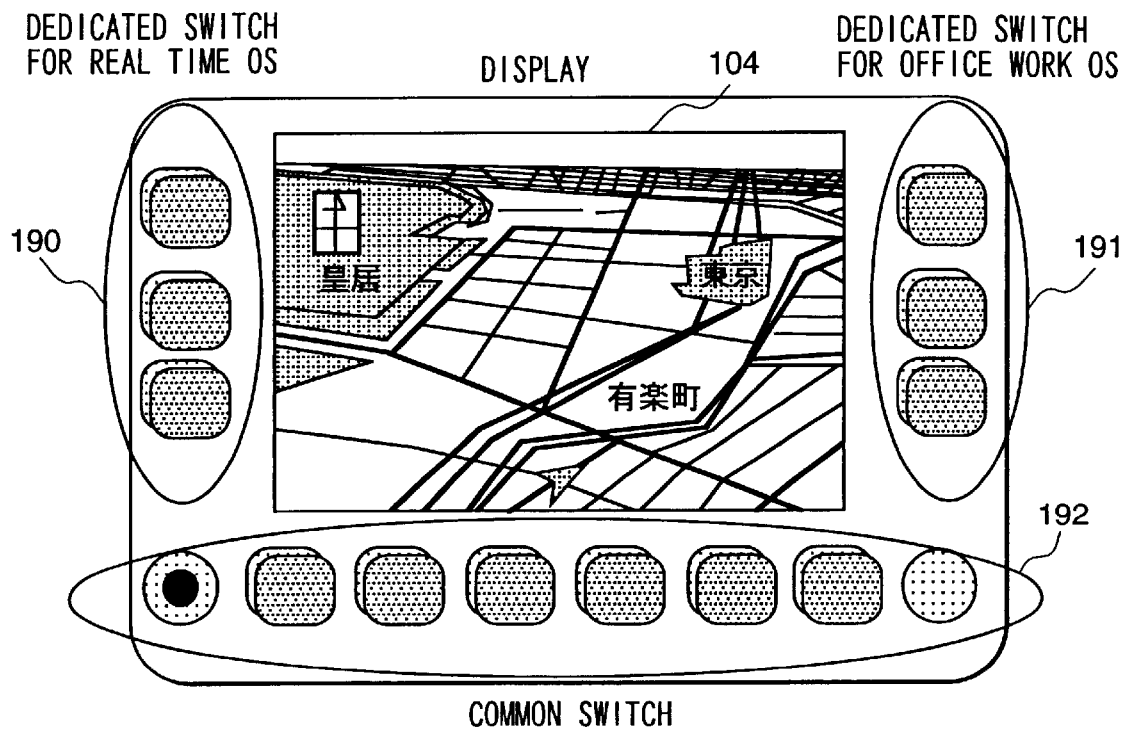
FIG. 11 is an illustration showing a construction of an input and output panel of a vehicle mounted navigation system.
FIG. 12 is an illustration showing a construction of a switch table.

The common interrupt handler 128 makes reference to the content of the executing OS storage parameter 154 after occurrence of interrupt to check whether the current executed operating system is the general purpose OS 116 or the real time OS 117 (process 210). Next, reference is made to the preferential interrupt table 156. If the common flag is not set, the operating system, to which the occurred interrupt corresponds, is attained with reference to the preferential interrupt table 156 (process 212). If the common flag is set, the interrupt objective operating system is determined by making judgment of the content of interrupt by accessing the input and output device (process 213). Here, comparing the content of interrupt and the switch table 200, when judgment is made that the dedicated switch for the real time OS is depressed, the real time OS 117 is stored as the interrupt objective OS, and when judgment is made that the dedicated switch for the general purpose OS is depressed, the general purpose OS 116 is stored as the interrupt objective OS. When judgment is made that the common switch is depressed, reference is made to the preferential interrupt table 156, the operating system, to which the occurred interrupt corresponds, is attained. Here, considering the case where the stored values in the preferential interrupt table 156 of FIG. 7 and the switch table 200 of FIG. 12 are used, if IRQ#2 is assigned to switch interrupt, when the switch #0 is input, reference is made to the real time OS, when the switch #2 is input, reference is made to the general purpose OS, and when the switch #3 is input, since the switch is for common use, reference is made to the preferential interrupt table 156 again to attain the interrupt objective operating system, such as the real time OS.

Next, check is performed whether the interrupt objective operating system is equal to the operating system in execution (process 214). If the occurred interrupt is not for the currently executed operating system, the operating system has to be once switched. This switching process is performed by requesting to the PS context switch module 127 (process 215). Next, check is performed whether the interrupt objective operating system is the general purpose OS 116 or the real time OS 117 (process 216). If the object is the general purpose OS 116, the interrupt handler 122 of the general purpose OS is actuated with reference to the interrupt address table 155 (process 217). If interrupt for the real time OS is caused, the interrupt handler 123 of the real time OS is actuated with reference to the interrupt address table 155, similarly (process 218). In general, when the task switching has to be performed by the interrupt process, the interrupt handlers 122 and 123 call the re-schedulers 118 and 119 and do not return the control to the common interrupt handler 128. However, if task switching is not caused, the process of the interrupt handler is terminated. At this time, the interrupt handlers 122 and 123 return the control to the common interrupt handler 128. The common interrupt handler 128 resumes operation from the process 219. The process 219 is the process for checking whether the operating system is switched upon occurrence of interrupt. When the operating system is switched by the process 215, the operating system has to be switched again to return to the original execution environment. Therefore, request is again made to the OS context switch module 127 to execute the switching process (process 220).

While discussion has been given hereinabove for a method to make the input and output device in common in the system where a plurality of operating systems are operated on the single computer with reference to the preferential interrupt table stored in the interrupt management table 129 from the common interrupt handler provided in the inter-OS control function 124, the method set for above cannot handle all of the cases. For example, in input and output device, such as a graphic accelerator or a serial communication, operating condition and various operation parameters are set from an input and output driver and holes the parameters and operating condition in the register within the hardware. For such input and output device, if the foregoing process is simply applied, the input and output drivers and interrupt handlers in respective operating systems cannot recognize switching of the operating systems to attempt to continue process from the condition set by the input and output driver of the preceding operating system. However, the parameters to be set can be normal values only as continued from the value finally set by the input and output driver of own operating system. It should be clear that the desired operation cannot be done if some parameter is written in the input and output device between switching of the operating system.

Figure 14:
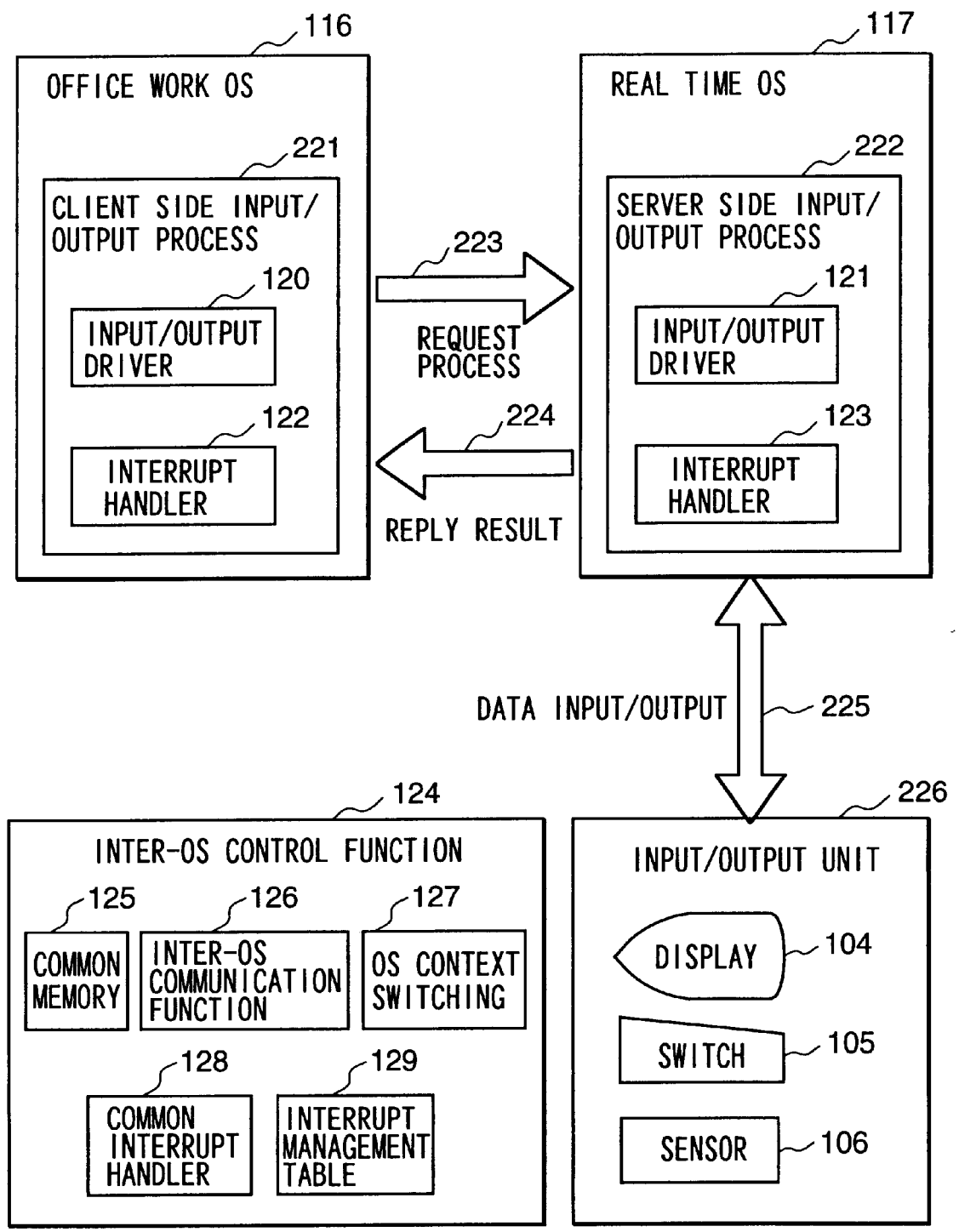
FIG. 14 is a second illustration showing the system construction in the second embodiment of the present invention.

In order to solve this problem, the present invention is characterized by application of a client-server model for the input and output process, such as the input and output drivers 120 and 121 and the interrupt handler 122 and 123 provided in each operating system as shown in FIG. 14. Namely, with one of the input and output process of a plurality of operating systems, an input and output process 222 on a server side is executed. The server side input and output process 222 behaves to manage the input and output device 226 common for a plurality of operating systems to execute data input and output 225 from the input and output driver 121 to the input and output device 226 and to operate for receiving the interrupt demand from the input and output device 226 by the interrupt handler 123. Furthermore, receiving a notice of the request from the client side input and output process 221 to make judgment for the content to perform data input and output 225 with the input and output device 226, and returns the result to the client side input and output device 226 as a report of the result. On the other hand, the client side input and output device 221 transmits a notice 223 of request for data input and output to the input and output device 226, to the server side input and output device 222, for executing the input and output process using the returned report of the result 224. Accordingly, the client side input and output process does not directly control the hardware of the input and output device 226, and the server side input and output device constantly manages the input and output device. Therefore, no discrepancy will be caused in the operating condition.

It should be noted that the server side input and output process 222 is desirably set in the operating system having higher preferential order. In the shown embodiment, since it is assumed that the real time OS has higher preferential order than the general purpose OS, the server side input and output process 222 is provided in the real time OS. By providing the server side input and output process, the operating system having higher preferential order can avoid occurrence of masking of the process, such as interrupt demand. Accordingly, unduly delaying of response upon occurrence of the interrupt demand can be avoided to attain a feature that missing of data can be avoided.

Hereinafter, among the modules shown in FIG. 14, process flow of the common interrupt handler 128 and the interrupt handlers 122 and 123 will be discussed.

[0045]

Figure 15:
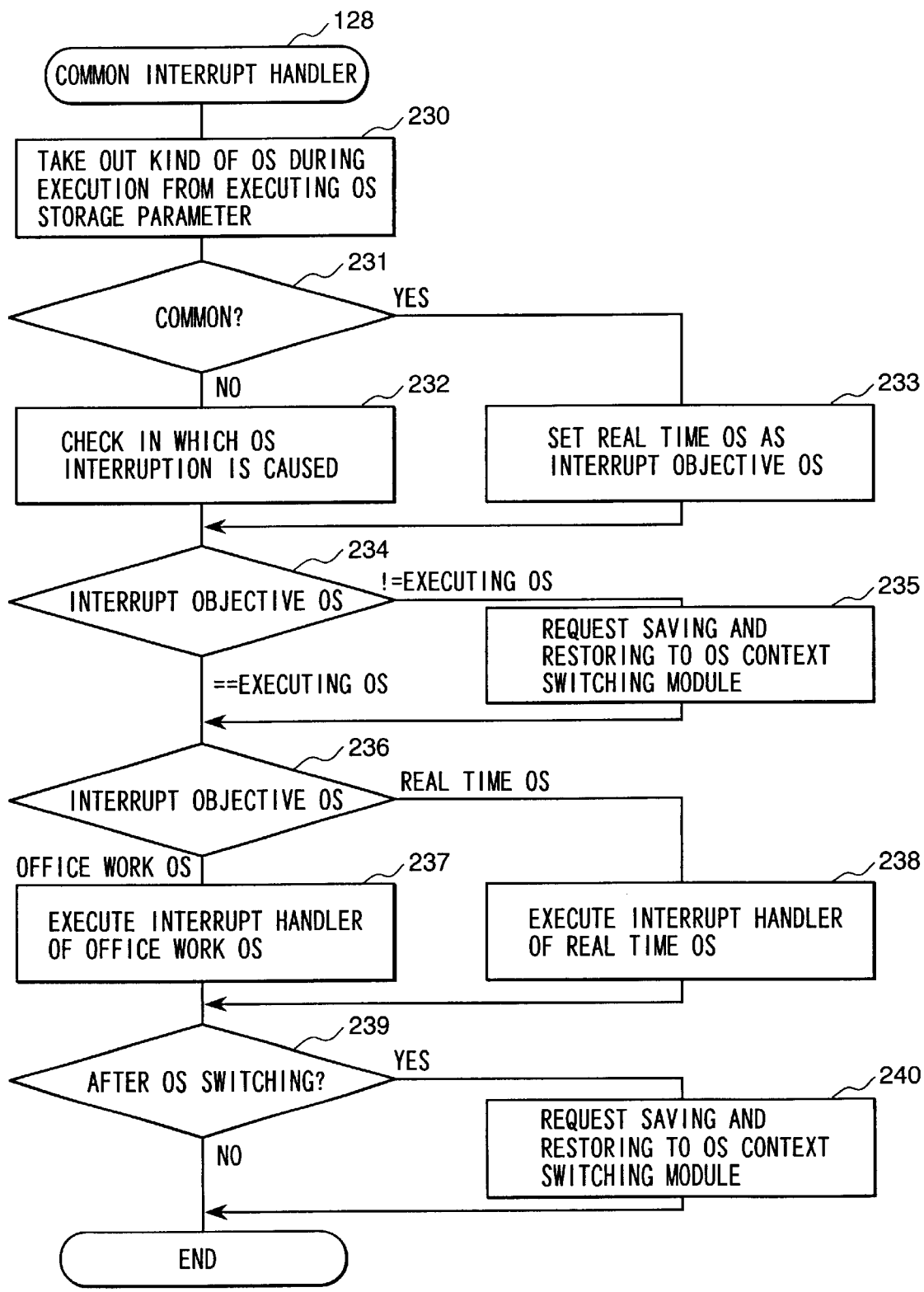
FIG. 15 is a third illustration showing the process flow of the common interrupt handler.

Operational flow of the common interrupt handler 128 when the client-server model shown in FIG. 14 is applied for input and output process, will be discussed with reference to FIG. 15. It should be noted that the basic system construction is similar to FIGS. 1 and 5, and, in the preferential interrupt table 156, for the interrupt number of the input and output device to be common for a plurality of operating systems, the common flag 1 is stored and for the interrupt number of the input and output device to be used in the particular operating system, the common flag 0 is stored. Furthermore, as shown in FIG. 14, the server side input and output process is provided in the real time OS 117 and the client side input and output process is provided in the general purpose OS.

[0046]

The common interrupt handler 128, at first, takes out the content of the executing OS storage parameter 154 after occurrence of interrupt to check whether the currently executed operating system is the general purpose OS 116 or the real time OS 118 (process 230). Next, reference is made to the preferential interrupt table 156 (process 231). If the common flag is not set, the operating system, to which the occurred interrupt corresponds, is attained with reference to the preferential interrupt table 156 (process 232). If the common flag 1 is set, the interrupt objective operating system is determined by making judgment of the content of interrupt by accessing the input and output device (process 233).

Next, check is performed whether the interrupt objective operating system is equal to the operating system in execution (process 234). If the occurred interrupt is not for the currently executed operating system, the operating system has to be once switched. This switching process is performed by requesting to the PS context switch module 127 (process 235). Next, check is performed whether the interrupt objective operating system is the general purpose OS 116 or the real time OS 117 (process 236). If the object is the general purpose OS 116, the interrupt handler 122 of the general purpose OS is actuated with reference to the interrupt address table 155 (process 237). If interrupt for the real time OS is caused, the interrupt handler 123 of the real time OS is actuated with reference to the interrupt address table 155, similarly (process 238). In general, when the task switching has to be performed by the interrupt process, the interrupt handlers 122 and 123 call the re-schedulers 118 and 119 and do not return the control to the common interrupt handler 128. However, if task switching is not caused, the process of the interrupt handler is terminated. At this time, the interrupt handlers 122 and 123 return the control to the common interrupt handler 128. The common interrupt handler 128 resumes operation from the process 239. The process 239 is the process for checking whether the operating system is switched upon occurrence of interrupt. When the operating system is switched by the process 235, the operating system has to be switched again to return to the original execution environment. Therefore, request is again made to the OS context switch module 127 to execute the switching process (process 240).

Figure 16:
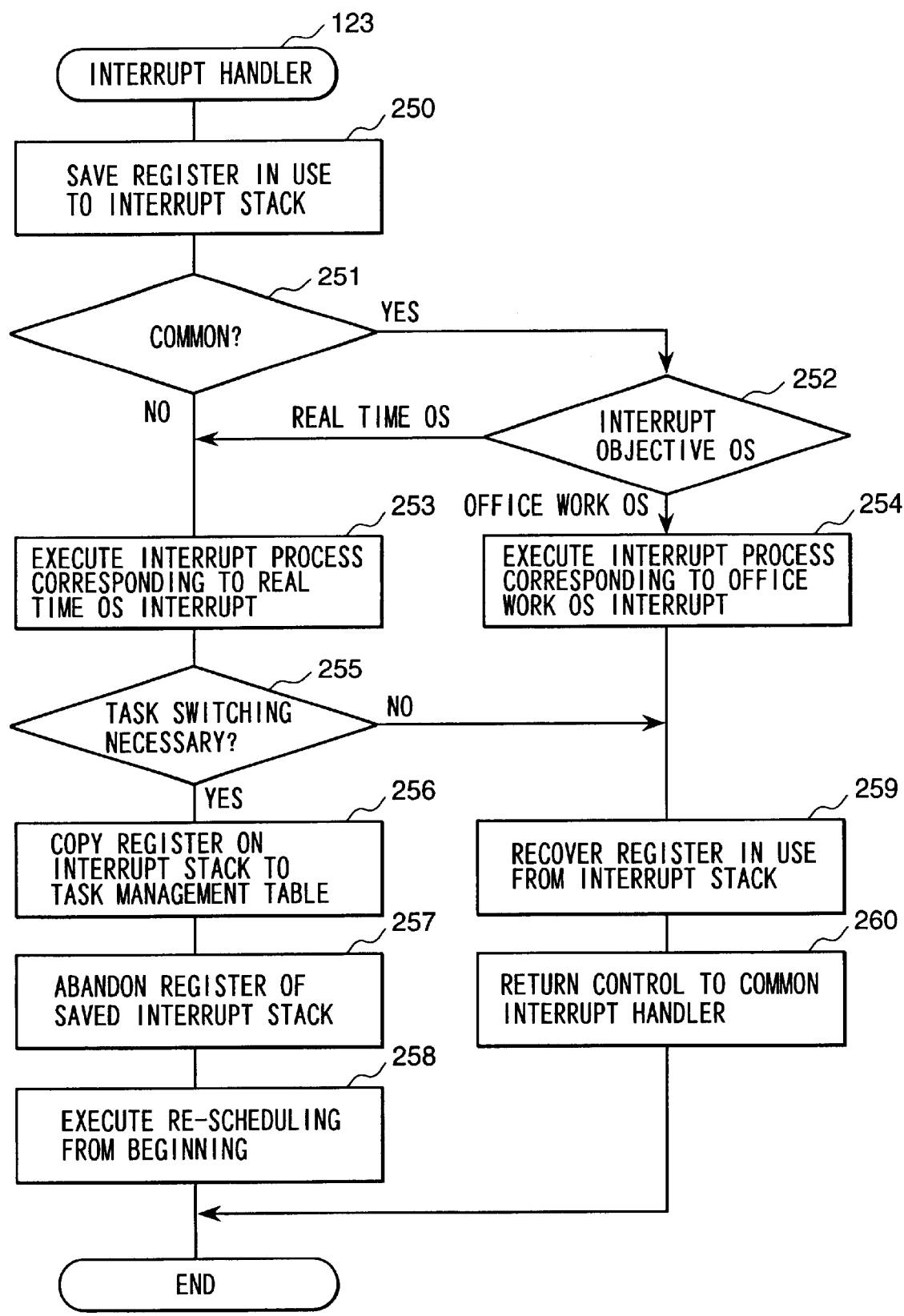
FIG. 16 is a second illustration showing the process flow of the interrupt handler.

FIG. 16 shows a process flow of the interrupt handler of the real time OS as a part of the server side input and output device 222 called from the common interrupt handler 128.

At first, the register in use is temporarily stored in the interrupt stack 153 (process 250). By making reference to the preferential interrupt table 156, judgment is made whether the input and output device demanding interrupt is common for a plurality of operating systems (process 251). If not common, it is the interrupt demand for the real time OS to execute the corresponding interrupt process (process 253). If common, reference is made to the preferential interrupt table 156 again to make judgment to which operating systems, the occurring interrupt demand corresponds (process 252). When the flag of the real time OS side is set or the common flag is not set, the interrupt process for the real time OS interrupt is executed (process 253). When the flag of the general purpose OS side is set, the interrupt process for the general purpose OS interrupt is executed (process 254). Here, the interrupt process 254 in the general purpose OS interrupt notifies occurrence of interrupt to the client side interrupt handler 122 to generate software interrupt to the general purpose OS 116. Furthermore, if necessary, information obtained through the software interrupt process is written in the common memory 125. It should be noted that the generated software interrupt has to be provided lower preferential order than the interrupt process executed currently. In execution of the interrupt process for the general purpose OS interrupt, since judgment for task switching is not required for no influence to the real time OS at all, the process of the interrupt handler 123 is terminated. Therefore, the register value temporarily stored in the interrupt stack 153 is restored (process 259), and the control is returned to the common interrupt handler (process 260). It should be noted that omitting of the process 255 is for speeding up of the process, and no problem will be arisen even in operation to execute the process 255.

On the other hand, after execution of the interrupt process corresponding to the real time OS interrupt (process 253), judgment is made whether task switching is necessary or not (process 255). If task switching is necessary, process of the interrupt handler 123 is terminated. Therefore, the register value temporarily stored on the interrupt stack 151 is restored (process 259), and the control is returned to the common interrupt handler (process 260) when judgment is made that task switching is necessary, the register value temporarily stored on the interrupt stack 151 is copied in the task management table (process 256), and the temporarily stored register on the interrupt stack is abandoned (process 257). Thereafter, the re-scheduler 119 is actuated (process 258). It should be noted that if the processor 100 is provided with a function to increase and decrease the value of the interrupt stack pointer 158 in conjunction with making reference to data on the memory, the processes 256 and 257 may be executed in a lump.

On the other hand, the interrupt handler 122 of the general purpose OS actuated by the software interrupt generated by the interrupt handler 123, executes the process of the same content as the operation flow with reference to FIG. 10 in most part. It should be noted that what is partially differentiated is execution of the interrupt process corresponding to interrupt shown in the process 181. Information obtained therein is written in the common memory 125. Accordingly, the process 181 in the interrupt handler 122 read out the information stored in the common memory 125 to operate to execution of the process corresponding to the interrupt to realize the interrupt process without directly accessing the input and output device.

Figure 17:
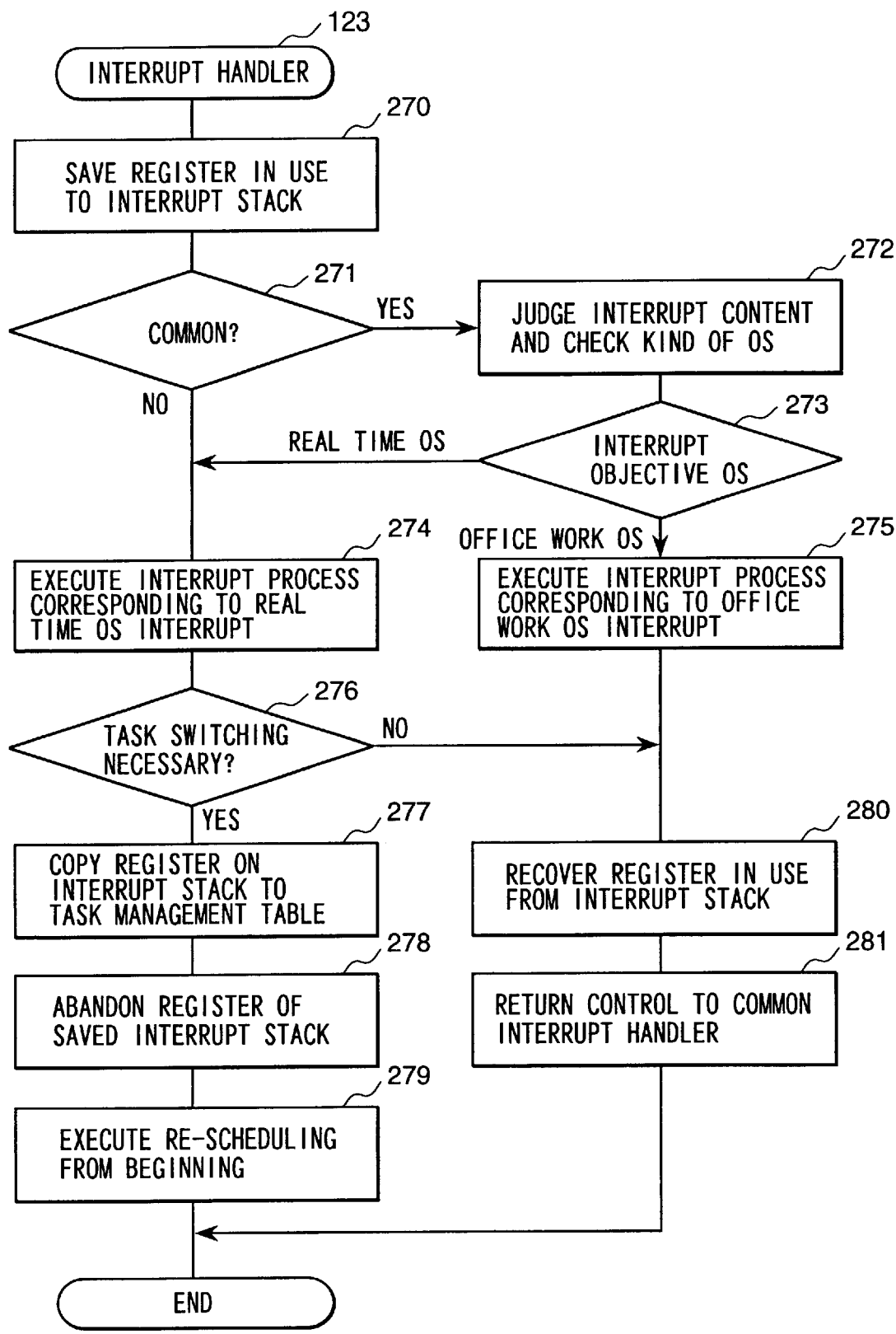
FIG. 17 is a third illustration showing the process flow of the interrupt handler.

On the other hand, even when the client-server model discussed in connection with FIG. 14 is applied and the input and output device is in common for a plurality of operating systems, similarly to the discussion given for FIGS. 11 to 13, it can occur a case where judgment cannot be made with which operating system the interrupt process is to be executed unless content of interrupt is checked. The process flow of the interrupt handler 123 provided in the real time OS 117 in this case will be discussed with reference to FIG. 17. It should be noted that the table for making judgment of the content of interrupt is established under the premise where the switch table 200 is used in similar manner as that discussed above, the process discussed herein is applicable not only for the switch but also for other input and output device.

At first, the register in use is temporarily stored in the interrupt stack 153 (process 270). By making reference to the preferential interrupt table 156, judgment is made whether the input and output device demanding interrupt is common for a plurality of operating systems (process 271). If not common, it is the interrupt demand for the real time OS to execute the corresponding interrupt process (process 274). If common flag is set, the interrupt objective operating system is judged by making judgment of the content of interrupt (process 272). Comparing the content of interrupt and the switch table 200, when judgment is made that the dedicated switch for the real time OS is depressed, the real time OS 117 is stored as the interrupt objective OS, and when judgment is made that the dedicated switch for the general purpose OS is depressed, the general purpose OS 116 is stored as the interrupt objective OS. On the other hand, when judgment is made that the common switch is depressed, reference is made to the preferential interrupt table 156, the operating system, for which the flag is set, is stored as the interrupt objective OS. Here, considering the case where the stored values in the preferential interrupt table 156 of FIG. 7 and the switch table 200 of FIG. 12 are used, and IRQ#2 is assigned to switch interrupt, when the switch #0 is input, reference is made to the real time OS, when the switch #2 is input, reference is made to the general purpose OS, and when the switch #3 is input, since the switch is for common use, reference is made to the preferential interrupt table 156 again to attain the interrupt objective operating system, such as the real time OS.

Next, with reference to the interrupt objective OS (process 273), if it is the real time OS 117, the interrupt process for the real time OS interrupt is executed (process 274). If it is the general purpose OS 116, the interrupt process 274 for the general purpose OS interrupt is executed (process 275). Here, the interrupt process 275 for the general purpose OS interrupt generates software interrupt for the general purpose OS 116 in order to notify the occurrence of interrupt to the client side interrupt handler 122. Furthermore, if necessary, information obtained through the software interrupt is written in the common memory 125. It should be appreciated that the generated software interrupt has to be provided lower preferential order than the interrupt process in execution.

In interrupt process execution corresponding to the general purpose OS interrupt, judgment of task switching is not necessary for not influencing to the real time OS at all. Accordingly, the process of the interrupt handler is terminated. Then, the register value temporarily stored in on the interrupt stack 153 is restored (process 280), and the control is returned to the common interrupt handler (process 281). It should be appreciated that omitting of the process 276 is for speeding up of the process, and no problem will be arisen even in operation to execute the process 276.

On the other hand, after execution of the interrupt process corresponding to the real time OS interrupt, judgment is made whether task switching is necessary or not (process 276). If task switching is necessary, process of the interrupt handler 123 is terminated. Therefore, the register value temporarily stored on the interrupt stack 153 is restored (process 280), and the control is returned to the common interrupt handler (process 281). When judgment is made that task switching is necessary, the register value temporarily stored on the interrupt stack 151 is copied in the task management table (process 277), and the temporarily stored register on the interrupt stack is abandoned (process 278). Thereafter, the re-scheduler 119 is actuated (process 279).

As set forth above, the method to apply the client-server model as the method for using the same input and output device in common for a plurality of operating systems, has been discussed. Here, while discussion has been given for a method to notify the occurrence of interrupt from the server side operating system to other operating system by software interrupt, if some communication means is provided, it becomes possible to notify occurrence of interrupt from the server side input and output process 222 to the client side input and output process 221. It can be replaced for the software interrupt set forth above. In the shown embodiment, in order to establish communication between two operating systems, the inter-OS communication function 126 as shown in FIG. 1 is provided. Therefore, a method for making the input and output device common for a plurality of operating systems will be discussed with reference to FIG. 18.

Figure 18:
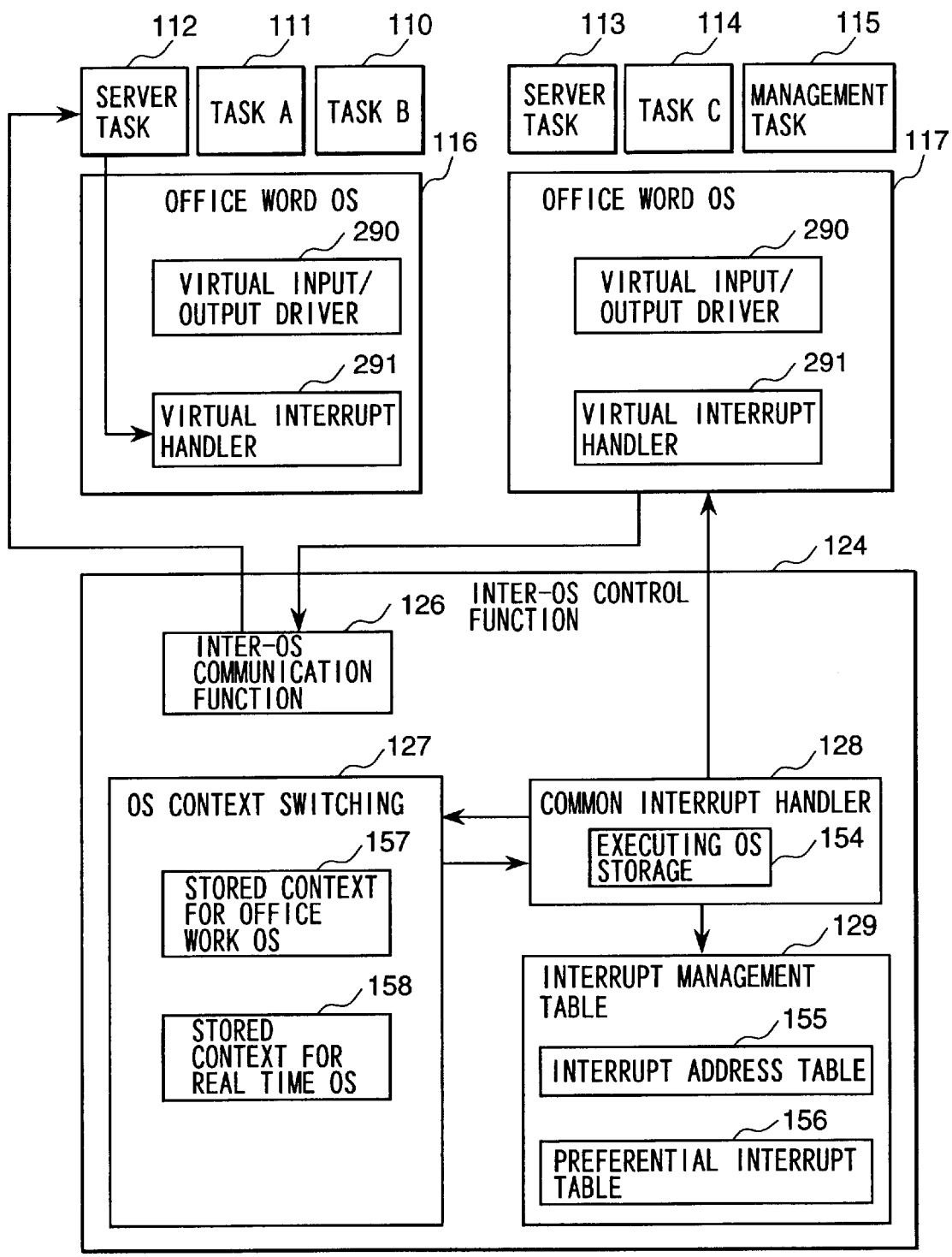
FIG. 18 is a first illustration showing a detail of an input and output processing program.

Most of Components in FIG. 18 are the same as components discussed in connection with FIGS. 1 and 5, but are differentiated in a virtual input and output driver 290 and a virtual interrupt handler 291 are provided in place of the input and output driver 120 and the interrupt handler 122 provided in the general purpose OS 116. The virtual input and output driver 290 provides an interface for accessing the input and output device from an application task but does not directly read and write the input and output device and directly control the input and output device. Here, using the message communication provided by the inter-OS communication function 126, reading and writing and control are requested to the input and output driver 121. Also, the result is also received from the input and output driver 121 using the message communication. The virtual interrupt handler 291 is actuated by the message transmitted from the interrupt handler 123 to execute the interrupt process.

Next, flow of the process upon occurrence of the interrupt demand for the input and output device common for both of the operating systems will be discussed with reference to FIG. 18. For convenience of illustration, in the preferential interrupt table of the interrupt number generated by the input and output device handled herein, the common flag 1 is set, and also, the flag is set on the side of the general purpose OS.

The interrupt demand generated by the input and output device is once trapped in the common interrupt handler 128. The process is executed according to the flow of FIG. 15. Here, since it is assumed that it is interrupt from the input and output device in common for both of the operating systems, the interrupt handler 123 provided in the real time OS is actuated. The interrupt handler 123 executes the process according to the flow discussed in connection with FIG. 16. Here, since it is assumed that common flag is set in the preferential interrupt table 156 and flag is set in the general purpose OS, the interrupt process 254 corresponding to the general purpose OS interrupt is executed. Here, the interrupt process 254 for the general purpose OS interrupt transmit the message to the virtual interrupt handler 291 on the client side using the inter-OS communication function in order to notify occurrence of interrupt to the virtual interrupt handler 281 on the client side. It should be noted that information obtained through the interrupt process may be transmitted with attaching to the message, and may transmit information by writing in the common memory 125 and making reference to from the virtual interrupt handler 291. Furthermore, when a message queue for receiving the message is not provided in the virtual interrupt handler 291, the message is transmitted once to the server task 112 provided as the application task and the virtual interrupt handler 291 is called from the server task 112 for actuating the virtual interrupt handler 291. The virtual interrupt handler 291 executes the interrupt process by making reference to the result of process of the interrupt process attached to the message or the common memory 125.

Figure 19:
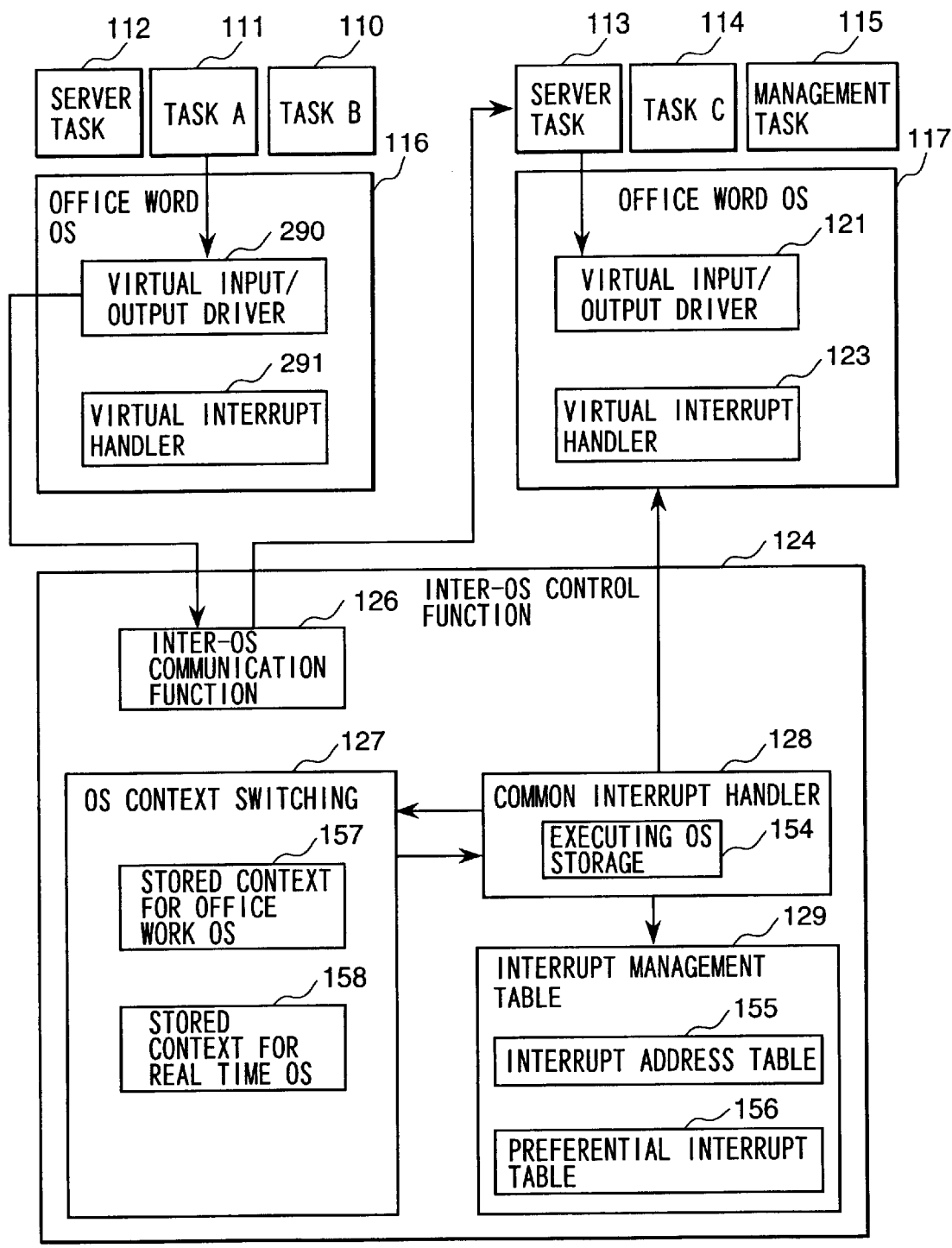
FIG. 19 is a second illustration showing a detail of an input and output processing program.

Furthermore, the flow of process for executing the input and output process requested from the task provided in the general purpose OS will be discussed with reference to FIG. 19. The virtual input and output driver 290 in the general purpose OS is only interface for accessing the input and output device from the office work IS, and requested input and output process is transferred to the input and output driver 121 using the inter-OS communication function 126. It should be noted that the information obtained by the virtual input and output driver 290 may be transmitted with attaching to the message, and also may be written in the common memory 125 and made reference to from the input and output driver 121 for transferring information. Furthermore, when the message queue for receiving the message is not provided in the input and output driver 121, the message is transmitted once to the server task 113 provided in the application task to actuate the input and output driver 121 by calling the input and output driver 121 from the server task 113. The input and output driver 121 executed the input and output process by making reference to the content of request attached to the message or the common memory 125.

Figure 20:
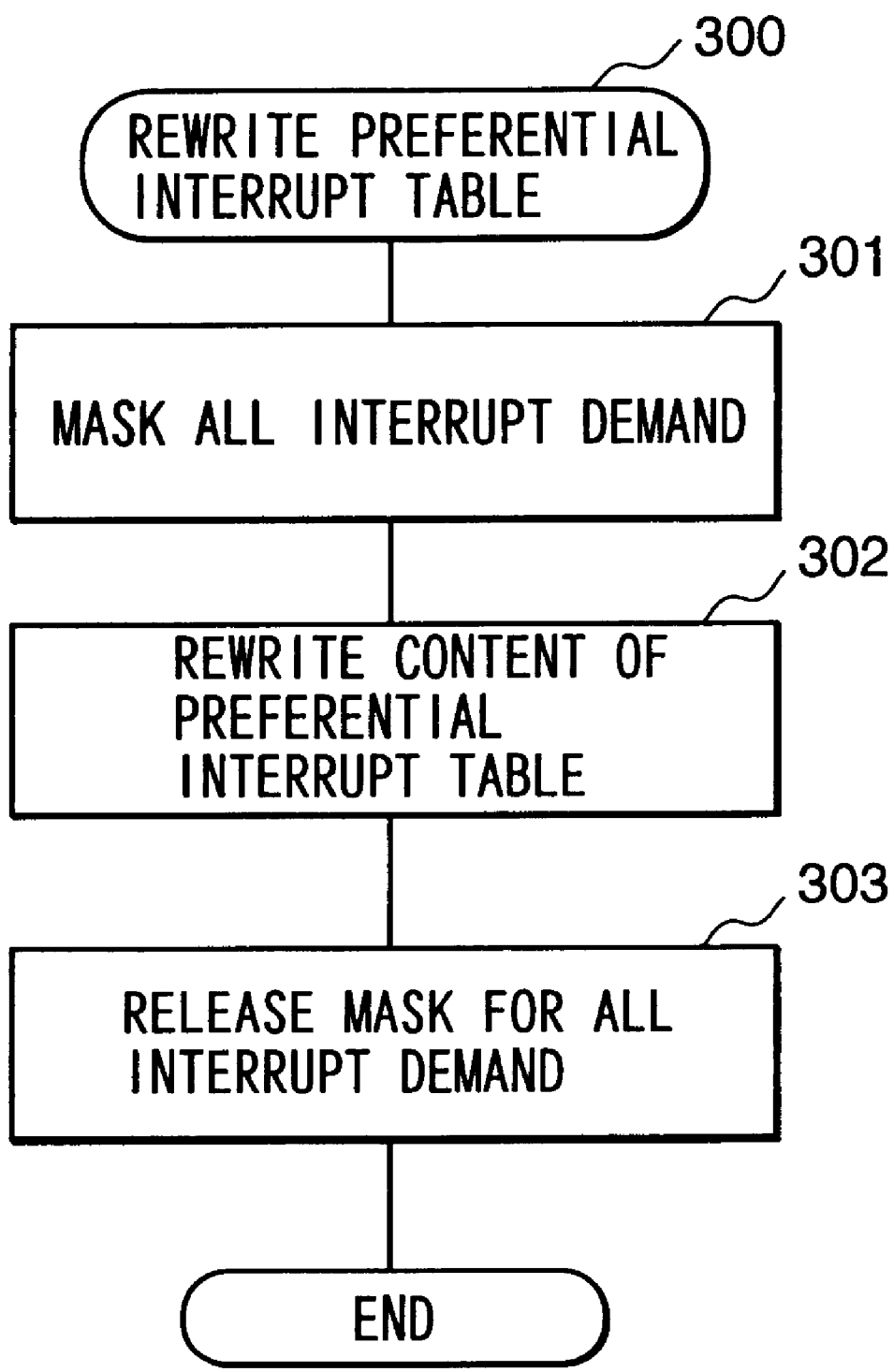
FIG. 20 is an illustration showing a flow of re-writing a preferential interrupt table.

Next, flow of re-writing of the preferential interrupt table provided in the inter-OS control function 124 will be discussed with reference to FIG. 20. The preferential interrupt table 156 is re-written by the management task 115 managing the user demand or so forth. However, it is possible to cause mismatching when the interrupt process makes reference to the preferential interrupt table during re-writing of the preferential interrupt table 156. Therefore, initially, all interrupt demand is masked so as not to cause any interrupt (process 301). It should be appreciated that it is also possible to mask only interrupt demand for the interrupt number for which re-writing is to be effected. After setting the interrupt mask, the content of the preferential interrupt table 156 is updated (process 302) and then the set interrupt mask is released (process 303) to permit re-writing of the preferential interrupt table 156.

Figure 21:
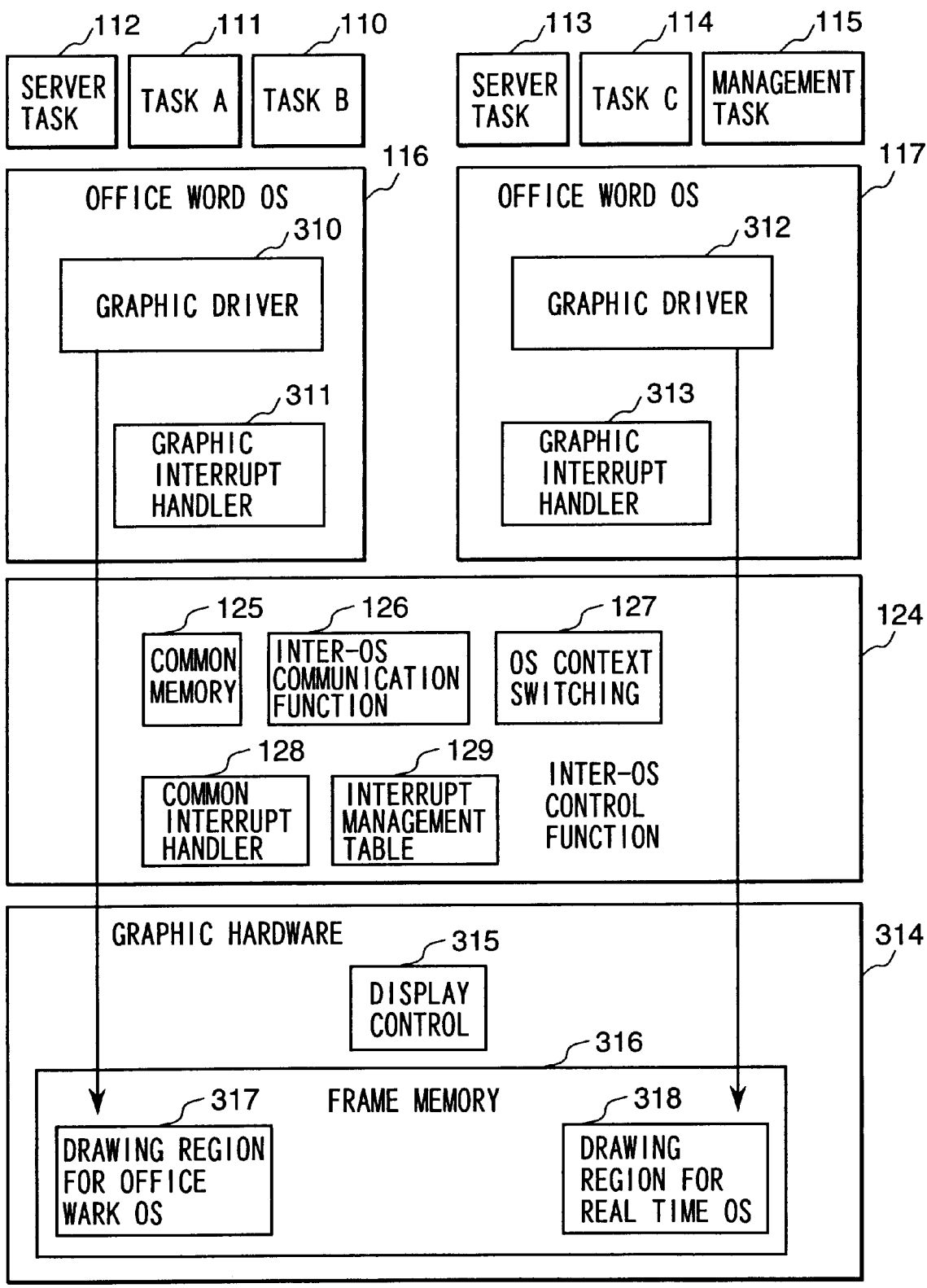
FIG. 21 is an illustration showing a construction of a system in which the present invention is applied to a graphic display device.

As set forth above, the method to make the input and output device common for a plurality operating systems has been discussed, an example of application of the present invention for a graphic display of a built-in equipment having a user interface, such as a vehicle mounted navigation system, as practical application, will be discussed with reference to FIG. 21. It should be noted that the operating system operated on the graphic display systems are the general purpose OS 116 and the real time OS 117 similarly to FIG. 1, and a task/thread operating on the real time OS is assumed to have higher preferential order than a task/thread operating on the general purpose OS.

The graphic display device has graphic drivers 310 and 312 parsing command for drawing and displaying and controlling a graphic hardware 314, graphic interrupt handlers 311 and 313 to be actuated by the interrupt demand generated by the graphics hardware, and the graphic hardware 314 displaying an image data developed to the pixels. The graphic hardware 314 has a frame memory 316 storing luminance value of each pixel and display control 315 taking out the luminance value of each pixel from frame memory 316 per vertical synchronization frequency to output to the display 104. Here, in the frame memory, conflict of resource is avoided by making the a drawing region 317 for general purpose OS storing image generated by the graphic driver 310 of the general purpose OS and a drawing region 318 for the real time OS storing image generated by a graphic f-Ydriver 312 of the real time OS independent or separated. By this, upon switching of the operating system, respective drawn image are stored. Even when the operating system is switched again, the process can be continued from the condition before switching. On the other hand, it is assumed that the graphic driver 312 and the graphic interrupt handler 313 provided in the real time OS operate as server, and the graphic driver 310 and the graphic interrupt handler 311 provided in the general purpose OS operate as client.

Operational flow in drawing and display demand from the application task incorporated in the real time OS will be discussed at first. The application task calls the drawing command provided in the graphic driver 312 to execute the drawing process. The drawing command is consisted of command for drawing line or polygon and commands designating attribute, such as line width, blotting pattern. The graphic driver 312 parses the drawing command to develop the pixels in the drawing region 318 for the real time OS. If the graphic hardware 314 includes an acceleration function executing developing the pixels by hardware, such function may be used. When drawing is completed, then, the display command provided in the graphic driver 312 is executed. The display command is consisted of a display start address in the frame memory 316 and a command designating a display size to display the image designated by controlling the register in the display control 315. When the displaying of the designated image is started, the display control generates an interrupt demand. The interrupt demand is once trapped in the common interrupt handler 128, and instantly judged as the interrupt demand from the common device to call the graphic interrupt handler 313. By this, the graphic interrupt handler 313 detects that the image is displayed.

Next, operational flow in the drawing and displaying demand from the application task incorporated in the general purpose OS 116 will be discussed. The application task calls drawing command provided in the graphic driver 310 to develop the pixels in the drawing region 317 for the general purpose OS. When drawing is completed, then, the display command provided in the graphic driver 310 is executed. The display command transfers message designating the display start address and the display size in the frame memory 316 to the graphic driver 312 using the inter-OS communication function 126. The graphic driver 312 receiving the demand displays the designated image by controlling the register in the display control 315. It should be noted that the graphic driver 312 makes judgment display demand from which operating systems has higher preference, to constantly display the frame memory to be preferentially displayed. When displaying of the designated image is started, the display control 315 generates the interrupt demand. The interrupt demand is once trapped by the common interrupt handler 128, and instantly judged as interrupt demand from the common device to actuate the graphic interrupt handler 313. The graphic interrupt handler 313 transfers the received interrupt demand to the graphic interrupt handler 311 using the inter-OS communication function 126. By this, the graphic interrupt handler 311 detects that the image is displayed.

The particular embodiment of the graphic display system, to which the present invention has been discussed hereinabove, various peripheral devices, such as serial/network communication, CD-ROM/DVD-ROM storage device, can-be made common for a plurality of operating systems by application of the present invention.

According to the present invention, in the computer system operating a plurality of operating systems with the single processor, the same input and output device can be used in common from the application tasks executed by respective operating systems to permit reduction of total number of the input and output devices. Furthermore, according to the present invention, the input and output device common for a plurality of operating systems and the input and output driver for data input and output, and the interrupt handler are loaded in one operating system, and by requesting input and output process to the input and output driver and the interrupt handler from the other operating system, the input and output process can be continued without resetting the input and output device to improve operability.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A computer system comprising:
concurrently operating plural operating systems; and
an operating system switch having a preferential interrupt table for storing an indication of an operating system to be actuated for each of a plurality of interrupt factors and an interrupt signal selector for sending out an interrupt signal to one of said concurrently operating plural operating systems, wherein said operating system switch switches to an operating system which corresponds to an interrupt factor, in reference to said preferential interrupt table, an interrupt signal is sent out to said operating system that is switched to by said interrupt signal selector, and an interrupt handler of said operating system is called.

2. A computer system comprising:

an operating system switch for switching a plurality of operating systems, said operating system switch making reference to a preferential interrupt table on the basis of an interrupt factor for switching to a corresponding operating system and calling an interrupt processor incorporated in said operating system, wherein said preferential interrupt table stores whether the interrupt is from a peripheral device common in a plurality of operating systems or not in addition to the operating systems to be actuated based on the interrupt factor.

3. A computer system as set forth in claim 2, wherein the operating system switch makes reference to the preferential interrupt table on the basis of the interrupt factor, makes a judgement whether the interrupt demand is for an interrupt common for a plurality of operating systems, determines an operating system to be an object for interrupt by parsing the content of the peripheral device generating interrupt as judged to be a common interrupt, for switching the operating system, and in conjunction therewith for calling an interrupt processor provided in said operating system.

4. A computer system comprising:

a plurality of operating systems;

an operating system switch for switching the plurality of operating systems;

a peripheral device that is common for a plurality of the operating systems;

a data inputting and outputting server for inputting and outputting data with the peripheral device that is used in common, provided in one of the operating systems; and a data inputting and outputting client for inputting and outputting data with an operating system other than said one operating system, requesting inputting and outputting data by said data inputting and outputting server and executing inputting and outputting of data by receiving a result of data inputting and outputting with the peripheral device in the data inputting and outputting server.

5. A computer system as set forth in claim 4, which further comprises a preferential interrupt table storing an operating system to be actuated per interrupt factor and a preferential interrupt table re-writer for re-writing the preferential interrupt table, said operating system switch making reference to the preferential interrupt table per interrupt factor, making a judgement whether the interrupt demand is for an interrupt that is common for a plurality of operating systems, and calling an interrupt processor included in said data inputting and outputting server if judged as a common interrupt.

6. A computer system as set forth in claim 4, wherein said data inputting and outputting server is provided in a region managed by the operating system having a highest preferential order.

7. A computer system as set forth in claim 4, which comprises inter-operating system communication device for mutual communication between a plurality of operating systems, said data inputting and outputting server and said data inputting and outputting client are in communication.

8. A computer system as set forth in claim 5, wherein said data inputting and outputting server is provided in a region managed by the operating system having a highest preferential order.

9. A computer system as set forth in claim 5, which comprises inter-operating system communication device for mutual communication between a plurality of operating systems, said data inputting and outputting server and said data inputting and outputting client are in communication.

10. A vehicle mounted navigation system, on which a plurality of operating systems are operative, comprising:

a plurality of switches for generating an interrupt factor for at least one operating system among said plurality of operating systems;

an OS selector for switching among said plurality of operating systems;

said OS selector switching among operating systems for making one of the operating systems corresponding to an operated switch active on the basis of a switch information indicative of an operating system selected through operation of one of said plurality of switches, and calling interrupt processing means incorporated in said operating system.

* * * * *